United States Patent
Siddiqui et al.

(10) Patent No.: US 8,437,502 B1
(45) Date of Patent: May 7, 2013

(54) GENERAL POSE REFINEMENT AND TRACKING TOOL

(75) Inventors: Matheen Siddiqui, Framingham, MA (US); Jason Davis, Bellingham, MA (US)

(73) Assignee: Cognex Technology and Investment Corporation, Mountain View, CA (US)

( * ) Notice: Subject to any disclaimer, the term of this patent is extended or adjusted under 35 U.S.C. 154(b) by 479 days.

(21) Appl. No.: 10/949,530

(22) Filed: Sep. 25, 2004

(51) Int. Cl.
| G06K 9/00 | (2006.01) |
| G06K 9/48 | (2006.01) |
| G06K 9/62 | (2006.01) |
| G06K 9/32 | (2006.01) |

(52) U.S. Cl.
USPC ............ 382/103; 382/199; 382/215; 382/294

(58) Field of Classification Search ................... 382/106, 382/159, 209, 215–216, 284, 293–296
See application file for complete search history.

(56) References Cited

U.S. PATENT DOCUMENTS

| 3,069,654 A | 12/1962 | Hough |
| 3,560,930 A | 2/1971 | Howard |
| 3,898,617 A | 8/1975 | Kashioka et al. |
| 3,899,240 A | 8/1975 | Gabor |
| 3,899,771 A | 8/1975 | Saraga et al. |
| 3,936,800 A | 2/1976 | Ejiri et al. |
| 3,986,007 A | 10/1976 | Ruoff |
| 4,146,924 A | 3/1979 | Birk et al. |
| 4,200,861 A | 4/1980 | Hubach et al. |
| 4,213,150 A | 7/1980 | Robinson et al. |
| 4,295,198 A | 10/1981 | Copeland et al. |
| 4,441,205 A | 4/1984 | Berkin et al. |
| 4,441,206 A | 4/1984 | Kuniyoshi et al. |
| 4,441,248 A | 4/1984 | Sherman et al. |

(Continued)

FOREIGN PATENT DOCUMENTS

| DE | 44 06 020 C1 | 6/1995 |
| DE | 4406020 | 6/1995 |

(Continued)

OTHER PUBLICATIONS

Kervrann and Heitz, "Robust Tracking of Stochastic Deformable Models in Long Image Sequences", 1994, Proceedings of the IEEE International Conference on Image Processing vol. 3, pp. 88-92.*

(Continued)

*Primary Examiner* — Randolph I Chu
*Assistant Examiner* — Nathan Bloom

(57) ABSTRACT

Per one embodiment, a method is provided for refining a pose estimate of a model. The model is coarsely aligned with a run-time image, and it represents a 2D pattern. The pose estimate includes at least one pose estimate parameter. The model has a plurality of model features, and the run-time image has a plurality of run-time features. A given distance value is determined representing a given distance between a given one of the plurality of model features mapped by a given pose estimate and a corresponding given run-time feature. A two-dimensional model description of the two-dimensional model pattern is provided. The two-dimensional model pattern is mapped using the given pose estimate to create a transformed version of the two-dimensional model pattern. The transformed version represents a non-linear movement of at least portions of the two-dimensional model pattern in a direction orthogonal to a plane of the two-dimensional model description.

87 Claims, 10 Drawing Sheets

Mapped Training Edgelets (red) superimposed on the runtime features (back)

Close up view of edgelets:
Note that each edgelet has a position and an orientation.

U.S. PATENT DOCUMENTS

| | | | |
|---|---|---|---|
| 4,567,610 A | 1/1986 | McConnell | |
| 4,581,762 A | 4/1986 | Lapidus et al. | |
| 4,618,989 A | 10/1986 | Tsukune et al. | |
| 4,637,055 A | 1/1987 | Taylor | |
| 4,651,341 A | 3/1987 | Nakashima et al. | |
| 4,672,676 A | 6/1987 | Linger | |
| 4,685,143 A | 8/1987 | Choate | |
| 4,707,647 A | 11/1987 | Coldrenet et al. | |
| 4,736,437 A | 4/1988 | Sacks et al. | |
| 4,763,280 A | 8/1988 | Robinson et al. | |
| 4,783,829 A | 11/1988 | Miyakawa et al. | |
| 4,799,175 A | 1/1989 | Sano et al. | |
| 4,809,348 A | 2/1989 | Meyer et al. | |
| 4,823,394 A | 4/1989 | Berkin et al. | |
| 4,843,631 A | 6/1989 | Steinpichler et al. | |
| 4,845,765 A | 7/1989 | Juvin et al. | |
| 4,849,914 A | 7/1989 | Medioni et al. | |
| 4,893,346 A | 1/1990 | Bishop | |
| 4,903,313 A | 2/1990 | Tachikawa | |
| 4,955,062 A | 9/1990 | Terui | |
| 4,972,359 A | 11/1990 | Silver et al. | |
| 4,979,223 A | 12/1990 | Manns et al. | |
| 4,980,971 A | 1/1991 | Bartschat et al. | |
| 5,003,166 A | 3/1991 | Girod | |
| 5,020,006 A | 5/1991 | Sporon-Fiedler | |
| 5,027,417 A | 6/1991 | Kitakado et al. | |
| 5,033,099 A | 7/1991 | Yamada et al. | |
| 5,040,231 A | 8/1991 | Terzian | |
| 5,046,109 A | 9/1991 | Fujimori et al. | |
| 5,048,094 A | 9/1991 | Aoyama et al. | |
| 5,072,384 A | 12/1991 | Doi et al. | |
| 5,111,516 A | 5/1992 | Nakano et al. | |
| 5,161,201 A | 11/1992 | Kaga et al. | |
| 5,168,530 A | 12/1992 | Peregrim et al. | |
| 5,177,559 A | 1/1993 | Bachelder et al. | |
| 5,206,917 A | 4/1993 | Ueno et al. | |
| 5,245,674 A | 9/1993 | Cass et al. | |
| 5,253,306 A | 10/1993 | Nishio | |
| 5,268,999 A | 12/1993 | Yokoyama | |
| 5,272,657 A | 12/1993 | Basehore et al. | |
| 5,280,351 A | 1/1994 | Wilkinson | |
| 5,313,532 A | 5/1994 | Harvey et al. | |
| 5,343,028 A | 8/1994 | Figarella et al. | |
| 5,343,390 A | 8/1994 | Doi et al. | |
| 5,347,595 A | 9/1994 | Bokser | |
| 5,351,310 A | 9/1994 | Califano | |
| 5,384,711 A | 1/1995 | Kanai et al. | |
| 5,406,642 A | 4/1995 | Maruya | |
| 5,459,636 A | 10/1995 | Gee et al. | |
| 5,471,541 A | 11/1995 | Burtnyk et al. | |
| 5,481,712 A | 1/1996 | Silver et al. | |
| 5,495,537 A | 2/1996 | Bedrosian et al. | |
| 5,497,451 A | 3/1996 | Holmes | |
| 5,513,275 A | 4/1996 | Khalaj et al. | |
| 5,515,453 A | 5/1996 | Hennessey et al. | |
| 5,524,064 A | 6/1996 | Oddou et al. | |
| 5,537,669 A | 7/1996 | Evans et al. | |
| 5,539,841 A | 7/1996 | Huttenlocher et al. | |
| 5,544,254 A | 8/1996 | Hartley et al. | |
| 5,545,887 A | 8/1996 | Smith et al. | |
| 5,548,326 A | 8/1996 | Michael | |
| 5,550,763 A | 8/1996 | Michael | |
| 5,550,937 A | 8/1996 | Bell et al. | |
| 5,555,317 A | 9/1996 | Anderson | |
| 5,555,320 A | 9/1996 | Irie et al. | |
| 5,557,684 A | 9/1996 | Wang et al. | |
| 5,559,901 A | 9/1996 | Lobregt | |
| 5,568,563 A | 10/1996 | Tanaka et al. | |
| 5,570,430 A | 10/1996 | Sheehan et al. | |
| 5,586,058 A | 12/1996 | Aloni et al. | |
| 5,602,937 A | 2/1997 | Bedrosian et al. | |
| 5,602,938 A | 2/1997 | Akiyama et al. | |
| 5,613,013 A | 3/1997 | Schuette | |
| 5,621,807 A | 4/1997 | Eibert et al. | |
| 5,623,560 A | 4/1997 | Nakajima et al. | |
| 5,625,707 A | 4/1997 | Diep et al. | |
| 5,625,715 A | 4/1997 | Trew et al. | |
| 5,627,912 A | 5/1997 | Matsumoto | |
| 5,631,975 A | 5/1997 | Riglet et al. | |
| 5,633,951 A | 5/1997 | Moshfeghi | |
| 5,638,116 A | 6/1997 | Shimoura et al. | |
| 5,638,489 A | 6/1997 | Tsuboka | |
| 5,640,200 A | 6/1997 | Michael | |
| 5,650,828 A | 7/1997 | Lee | |
| 5,657,403 A | 8/1997 | Wolff et al. | |
| 5,663,809 A | 9/1997 | Miyaza et al. | |
| 5,673,334 A | 9/1997 | Nichani et al. | |
| 5,676,302 A | 10/1997 | Petry | |
| 5,686,973 A | 11/1997 | Lee | |
| 5,694,482 A | 12/1997 | Maali et al. | |
| 5,694,487 A | 12/1997 | Lee | |
| 5,703,960 A | 12/1997 | Soest | |
| 5,703,964 A | 12/1997 | Menon et al. | |
| 5,708,731 A | 1/1998 | Shimotori et al. | |
| 5,717,785 A | 2/1998 | Silver | |
| 5,754,226 A | 5/1998 | Yamada et al. | |
| 5,757,956 A | 5/1998 | Koljonen et al. | |
| 5,768,421 A | 6/1998 | Gaffin et al. | |
| 5,793,901 A | 8/1998 | Matsutake et al. | |
| 5,796,868 A | 8/1998 | Dutta-Choudhury et al. | |
| 5,815,198 A | 9/1998 | Vachtsevanos et al. | |
| 5,822,742 A | 10/1998 | Alkon et al. | |
| 5,825,913 A | 10/1998 | Rostami et al. | |
| 5,825,922 A | 10/1998 | Pearson et al. | |
| 5,828,769 A | 10/1998 | Burns | |
| 5,828,770 A | 10/1998 | Leis et al. | |
| 5,845,007 A | 12/1998 | Ohashi et al. | |
| 5,845,288 A | 12/1998 | Syeda-Mahmood | |
| 5,848,184 A | 12/1998 | Taylor et al. | |
| 5,850,466 A | 12/1998 | Schott et al. | |
| 5,850,469 A | 12/1998 | Martin et al. | |
| 5,862,245 A | 1/1999 | Renouard et al. | |
| 5,864,779 A | 1/1999 | Fujimoto | |
| 5,871,018 A | 2/1999 | Delp et al. | |
| 5,875,040 A | 2/1999 | Matraszek et al. | |
| 5,881,170 A | 3/1999 | Araki et al. | |
| 5,890,808 A | 4/1999 | Neff et al. | |
| 5,912,984 A | 6/1999 | michael et al. | |
| 5,912,985 A | 6/1999 | Morimoto et al. | |
| 5,917,733 A | 6/1999 | Bangham | |
| 5,926,568 A | 7/1999 | Chaney et al. | |
| 5,930,391 A | 7/1999 | Kinjo | |
| 5,933,516 A | 8/1999 | Tu et al. | |
| 5,933,523 A | 8/1999 | Drisko et al. | |
| 5,937,084 A | 8/1999 | Crabtree et al. | |
| 5,940,535 A | 8/1999 | Huang | |
| 5,943,442 A | 8/1999 | Tanaka | |
| 5,950,158 A | 9/1999 | Wang | |
| 5,970,182 A * | 10/1999 | Goris | 382/278 |
| 5,974,169 A | 10/1999 | Bachelder | |
| 5,982,475 A | 11/1999 | Bruning et al. | |
| 5,987,172 A | 11/1999 | Michael | |
| 5,995,648 A | 11/1999 | Drisko et al. | |
| 5,995,953 A | 11/1999 | Rindtorff et al. | |
| 6,002,793 A | 12/1999 | Silver et al. | |
| 6,005,978 A | 12/1999 | Garakani | |
| 6,021,220 A | 2/2000 | Anderholm | |
| 6,023,530 A | 2/2000 | Wilson | |
| 6,026,186 A | 2/2000 | Fan | |
| 6,026,359 A | 2/2000 | Yamaguchi et al. | |
| 6,035,006 A | 3/2000 | Michael | |
| 6,035,066 A | 3/2000 | Michael | |
| 6,052,489 A | 4/2000 | Sakaue | |
| 6,061,086 A | 5/2000 | Reimer et al. | |
| 6,064,388 A | 5/2000 | Reyzin | |
| 6,064,958 A | 5/2000 | Takahashi et al. | |
| 6,067,379 A | 5/2000 | Silver | |
| 6,070,160 A | 5/2000 | Geary et al. | |
| 6,078,700 A | 6/2000 | Sarachik | |
| 6,081,620 A | 6/2000 | Anderholm | |
| 6,111,984 A | 8/2000 | Fukasawa | |
| 6,115,052 A | 9/2000 | Sakaue | |
| 6,118,893 A | 9/2000 | Li | |
| 6,122,399 A | 9/2000 | Moed | |
| 6,128,405 A | 10/2000 | Fuji | |
| 6,137,893 A | 10/2000 | Michael et al. | |
| 6,151,406 A | 11/2000 | Chang et al. | |

| | | |
|---|---|---|
| 6,154,566 A | 11/2000 | Mine et al. |
| 6,154,567 A | 11/2000 | McGarry |
| 6,173,066 B1 | 1/2001 | Peurach et al. |
| 6,173,070 B1 | 1/2001 | Michael et al. |
| 6,178,261 B1 | 1/2001 | Williams et al. |
| 6,178,262 B1 | 1/2001 | Picard et al. |
| 6,215,915 B1 | 4/2001 | Reyzin |
| 6,226,418 B1 | 5/2001 | Miller et al. |
| 6,246,478 B1 | 6/2001 | Chapman et al. |
| 6,272,244 B1 | 8/2001 | Takahashi et al. |
| 6,272,245 B1 | 8/2001 | lin |
| 6,311,173 B1 | 10/2001 | Levin |
| 6,324,298 B1 | 11/2001 | O'Dell et al. |
| 6,324,299 B1 | 11/2001 | Sarachik et al. |
| 6,336,082 B1* | 1/2002 | Nguyen et al. ............... 702/179 |
| 6,345,106 B1 | 2/2002 | Borer |
| 6,363,173 B1 | 3/2002 | Stentz et al. |
| 6,381,366 B1 | 4/2002 | Taycher et al. |
| 6,381,375 B1 | 4/2002 | Reyzin |
| 6,385,340 B1 | 5/2002 | Wilson |
| 6,408,109 B1 | 6/2002 | Silver et al. |
| 6,421,458 B2 | 7/2002 | Michael et al. |
| 6,424,734 B1 | 7/2002 | Roberts et al. |
| 6,453,069 B1 | 9/2002 | Matsugu et al. |
| 6,457,032 B1 | 9/2002 | Silver |
| 6,462,751 B1 | 10/2002 | Felser et al. |
| 6,466,923 B1 | 10/2002 | Young et al. |
| 6,529,852 B2 | 3/2003 | Knoll et al. |
| 6,532,301 B1 | 3/2003 | Krumm et al. |
| 6,574,353 B1* | 6/2003 | Schoepflin et al. ........... 382/103 |
| 6,594,623 B1 | 7/2003 | Wang et al. |
| 6,625,303 B1 | 9/2003 | Young et al. |
| 6,636,634 B2 | 10/2003 | Melikian et al. |
| 6,658,145 B1* | 12/2003 | Silver et al. ................... 382/149 |
| 6,681,151 B1 | 1/2004 | Weinzimmer et al. |
| 6,687,402 B1 | 2/2004 | Taycher et al. |
| 6,690,842 B1 | 2/2004 | Silver et al. |
| 6,691,126 B1 | 2/2004 | Syeda-Mahmood |
| 6,691,145 B1 | 2/2004 | Shibata et al. |
| 6,714,679 B1 | 3/2004 | Scola et al. |
| 6,728,582 B1 | 4/2004 | Wallack |
| 6,748,112 B1* | 6/2004 | Nguyen et al. ................ 382/203 |
| 6,751,338 B1 | 6/2004 | Wallack |
| 6,751,361 B1 | 6/2004 | Wagman |
| 6,760,483 B1 | 7/2004 | Elichai et al. |
| 6,771,808 B1 | 8/2004 | Wallack |
| 6,785,419 B1 | 8/2004 | Jojic et al. |
| 6,850,646 B1 | 2/2005 | Silver |
| 6,856,698 B1 | 2/2005 | Silver et al. |
| 6,859,548 B2 | 2/2005 | Yoshioka et al. |
| 6,909,798 B1 | 6/2005 | Yukawa et al. |
| 6,950,548 B1 | 9/2005 | Bachelder et al. |
| 6,959,112 B1 | 10/2005 | Wagman |
| 6,963,338 B1 | 11/2005 | Bachelder et al. |
| 6,973,207 B1 | 12/2005 | Akopyan et al. |
| 6,975,764 B1 | 12/2005 | Silver et al. |
| 6,985,625 B1 | 1/2006 | Silver et al. |
| 6,993,177 B1 | 1/2006 | Bachelder |
| 6,993,192 B1 | 1/2006 | Silver et al. |
| 7,006,712 B1 | 2/2006 | Silver et al. |
| 7,016,539 B1 | 3/2006 | Silver et al. |
| 7,043,055 B1 | 5/2006 | Silver |
| 7,043,081 B1 | 5/2006 | Silver et al. |
| 7,058,225 B1 | 6/2006 | Silver et al. |
| 7,065,262 B1 | 6/2006 | Silver et al. |
| 7,088,862 B1 | 8/2006 | Silver et al. |
| 7,139,421 B1 | 11/2006 | Fix et al. |
| 7,164,796 B1* | 1/2007 | Silver et al. ................... 382/209 |
| 7,190,834 B2* | 3/2007 | Davis ............................. 382/181 |
| 7,239,929 B2 | 7/2007 | Ulrich et al. |
| 7,251,366 B1 | 7/2007 | Silver et al. |
| 8,081,820 B2 | 12/2011 | Davis et al. |
| 2002/0054699 A1 | 5/2002 | Roesch et al. |
| 2002/0158636 A1* | 10/2002 | Tyan et al. ..................... 324/500 |
| 2002/0181782 A1* | 12/2002 | Monden ......................... 382/215 |
| 2003/0103647 A1* | 6/2003 | Rui et al. ....................... 382/103 |
| 2004/0081346 A1 | 4/2004 | Louden et al. |
| 2004/0136567 A1* | 7/2004 | Billinghurst et al. ......... 382/103 |
| 2005/0105804 A1* | 5/2005 | Francos et al. ................ 382/215 |
| 2005/0117801 A1 | 6/2005 | Davis et al. |
| 2005/0259882 A1* | 11/2005 | Dewaele ........................ 382/243 |

FOREIGN PATENT DOCUMENTS

| | | |
|---|---|---|
| JP | 6378009 | 4/1988 |
| JP | 6160047 | 6/1994 |
| JP | 3598651 | 12/2004 |
| WO | WO-9718524 | 5/1997 |

OTHER PUBLICATIONS

Zhong et. al., "Ojbect Tacking Using Deformable Templates", IEEE Transactions on Pattern Analysis and Machine Intelligence, vol. 22 No. 5, May 2000.*

Jain and Zhong, "Object Matching Using Deformable Templates", IEEE Transaction on Pattern Analysis and Machine Intelligence, vol. 18, No. 3, Mar. 1996.*

Jain and Zhong, "Deformable Template models: A Review", 1998 Elsevier Science, Signal Processing 71, pp. 109-129.*

Zitova and Flusser, "Image Registration Methods: A Survey", Image and Vision Computing 21 (2003), pp. 977-1000, Elsevier 2003.*

Eric Marchand, Patrick Bouthemy, Francois Chaumette, A 2D-3D model-based approach to real-time visual tracking, Image and Vision Computing, vol. 19, Issue 13, Nov. 1, 2001, pp. 941-955, ISSN 0262-8856, DOI: 10.1016/S0262-8856(01)00054-3.*

Gdalyahu, Yoram et al., "Self-Organization in Vision: Stochastic Clustering for Image Segmentation, Perceptual Grouping, and Image Database Organization", *IEEE Transactions on Pattern Analysis and Machine Intelligence*, IEEE Inc., New York, US, vol. 23, No. 10, Oct. 2001, 1053-1074.

Pauwels, E. J., et al., "Finding Salient Regions in Images", *Computer Vision and Image Understanding*, Academic Press, San Diego, CA, US, vol. 75, No. 1-2 (Jul. 1999), 73-85.

Scanlon, James et al., "Graph-Theoretic Algorithms for Image Segmentation", *Circuits and Systems*, ISCAS '99 Proceedings of the 1999 IEEE International Symposium on Orlando, FL, IEEE, (May 30, 1999), 141-144.

Shi, Jianbo et al., "Normalized Cuts and Image Segmentation", *Computer Vision and Pattern Recognition*, Proceedings, IEEE Computer Society.Conference on San Juan, IEEE Comput. Soc., (Jun. 17, 1997), 731-737.

Xie, Xuanli L., et al., "A New Fuzzy Clustering Validity Criterion and its Application to Color Image Segmentation", *Proceedings of the International.Symposium on Intelligent Control*, New York, IEEE, (Aug. 13, 1991), 463-468.

Mehrotra, Rajiv et al., "Feature-Based Retrieval of Similar Shapes", *Proceedings of the International Conference on Data Engineering*, Vienna, IEEE Comp. Soc. Press, Vol COnf. 9, (Apr. 19, 1993), 108-115.

Belongie, S. et al., "Shape Matching and Object Recognition Using Shape Contexts", *IEEE Transactions on Pattern Analysis and Machine Intelligence*, IEEE Inc. New York, vol. 24, No. 4, (Apr. 2003), 509-522.

Ohm, Jens-Rainer "Digitale Bildcodierung", *Springer Verlag*, Berlin 217580, XP002303066, Section 6.2 Bewegungschatzung, (1995).

Wei, Wen et al., "Recognition and Inspection of Two-Dimensional Industrial Parts Using Subpolygons", *Pattern Recognition*, Elsevier, Kidlington, GB, vol. 25, No. 12, (Dec. 1, 1992), 1427-1434.

Bileschi, S. et al., "Advances in Component-based Face Detection", *Lecture notes in Computer Science*, Springer Verlag, New York, NY, vol. 2388, (2002), 135-143.

Fitzpatrick, J M., et al., "Handbook of Medical Imaging", vol. 2: *Medical image Processing and Analysis*, SPIE Press, Bellingham, WA, (2000), 447-513.

Bookstein, F L., "Principal Warps: Thin-Plate Splines and the Decomposition of Deformations", *IEEE Transactions on pattern Analysis and Machine Intelligence*, IEEE Inc., New York, vol. 11, No. 6, (Jun. 1, 1989).

Zhang, Zhengyou "Parameter estimation techniques: A tutorial with application to conic fitting", *Imag Vision Comput; Image and Vision computing*; Elsevier Science Ltd, Oxford England, vol. 15, No. 1, (Jan. 1, 1997).

Stockman, G et al., "Matching images to models for registration and object detection via clustering", *IEEE Transaction of Pattern Analysis and Machine Intelligence*, IEEE Inc., New York, vol. PAMI-4, No. 3(1982).

Ballard, D. H., et al., "Generalizing the Hough Transform to Detect Arbitrary Shapes", *Pattern Recognition*, vol. 13, No. 2 Pergamon Press Ltd. UK, (1981), pp. 111-122.

Ballard, et al., "Searching Near and Approximate Location", Section 4.2, *Computer Vision*, (1982), pp. 121-131.

Brown, Lisa G., "A Survey of Image Registration Techniques", *ACM Computing Surveys*, vol. 24, No. 4 Association for Computing Machinery, (1992), pp. 325-376.

Caelli, et al., "Fast Edge-Only Matching Techniques for Robot Pattern Recognition", *Computer Vision, Graphics and Image Processing* 39, Academic Press, Inc., (1987), pp. 131-143.

Caelli, et al., "On the Minimum Number of Templates Required for Shift, Rotation and Size Invariant Pattern Recognition", *Pattern Recognition*, vol. 21, No. 3, Pergamon Press plc, (1988), pp. 205-216.

"Cognex 2000/3000/4000 Vision Tools", *Cognex Corporation*, Chapter 2 Searching Revision 5.2 P/N 590-0103, (1992), pp. 1-68.

"Cognex 3000/4000/5000 Programmable Vision Engines, Vision Tools", *Chapter 1 Searching, Revision 7.4 590-1036*, (1996), pp. 1-68.

Ballard, et al., "The Hough Method for Curve Detection", Section 4.3, *Computer Vision*, (1982), pp. 121-131.

"Cognex 3000/4000/5000 Programmable Vision Engines, Vision Tools", Chapter 14 *Golden Template Comparision*, (1996), pp. 569-595.

"Apex Search Object Library Functions", *Cognex Corporation*, (1998).

"Apex Search Object", *acuWin* version 1.5, (1997), pp. 1-35.

"Apex Model Object", *Cognex Corporation*, acuWin version 1.5, (1997), pp. 1-17.

"Description of Sobel Search", *Cognex Corporation*, (1998).

Crouzil, et al., "A New Correlation Criterion Based on Gradient Fields Similarity", *Proceedings of the 13th International Conference on Pattern Recognition* vol. I Track A, Computer Vision, (1996), pp. 632-636.

Grimson, et al., "On the Sensitivity of the Hough Transform for Object Recognition", *IEEE Transactions on Pattern Analysis and Machine Intelligence*, vol. 12. No. 3, (1990), pp. 255-274.

Hsieh, et al., "Image Registration Using a New Edge-Based Approach", *Computer Vision and Image Understanding*, vol. 67, No. 2, (1997), pp. 112-130.

Rosenfeld, et al., "Coarse-Fine Template Matching", *IEEE Transactions on Systems, Man, and Cybernetics*, (1997), pp. 104-107.

Tian, et al., "Algorithms for Subpixel Registration", *Computer Vision Graphics and Image Processing* 35, Academic Press, Inc., (1986), pp. 220-233.

Joseph, S. H., "Fast Optimal Pose Estimation for Matching in Two Dimensions", *Image Processing and its Applications*, Fifth International Conference, (1995).

Geiger, et al., "Dynamic Programming for Detecting, Tracking, an Matching Deformable contours", *IEEE* (1995), pp. 294-302.

Cootes, T. F., et al., "Active Shape Models—Their Training and Application", *Computer Vision and Image Understanding*, vol. 61, No. 1, (Jan. 1995), 38-59.

Shi, Jianbo et al., "Normalized Cuts and Image Segmentation", *IEEE Transaction on Pattern Analysis and Machine Intelligence*, vol. 22, No. 8, (Aug. 2000), 888-905.

Borgefors, Gunilla "Hierarchical Chamfer Matching: A Parametric Edge Matching Algorithm", *IEEE Transaction on Pattern Analysis and Mchine Intelligence*, vol. 10, No. 6, (Nov. 1988).

Huttenlocher, Daniel P., "Comparing Images using the Hausdorff Distance", *IEEE Transactions on Pattern Analysis and Machine Intelligence*, vol. 15, No. 9, (Sep. 1993).

"Complaint and Jury Demand", US District Court, District of Massachusetts, *Cognex Corp.* and *Cognex Technology and Investment Corp.* v. *MVTEC Software GmbH; MVTEC, LLC*; and *Fuji America Corp.* Case No. 1:08-cv-10857-JLT, (May 21, 2008).

"Fuji America'S Answer and Counterclaims", United States District Court District of Massachusetts, *Cognex Corp.* and *Cognex Technology and Investment Corp.* v. *MVTEC Software GmbH; MVTEC, LLC*; and *Fuji America Corp.* Case No. 1:08-cv-10857-JLT, (Aug. 8, 2008).

"Plaintiffs Cognex Corporation and Cognex Technology & Investment Corporation's Reply to Counterclaims of MVTEC Software GmbH and MVTEC LLC", *Cognex Corp.* and *Cognex Technology and Investment Corp.* v. *MVTEC Software GmbH; MVTEC, LLC*; and *Fuji America Corp.* Case No. 1:08-cv-10857-JLT, (Aug. 2008).

Wallack, Aaron S., "Robust Algorithms for Object Localization", *International Journal of Computer Vision*, (May 1998), 243-262.

P. Tissainayagam et al., *Contour Tracking with Automatic Motion Model Switching*, Pattern Recognition (36), 2003, pp. 2411-2427.

Perkins, W.A. Inspector: A Computer Vision System that learns to Inspect Parts, IEEE Transactions on Pattern Analysis and Machine Vision Intelligence, vol. PAMI-5, No. 6, (Nov. 1983).

Cox, et al., Predicting and Estimating the Accuracy of a Subpixel Registration Algorithm, IEEE Transactions on Pattern Analysis and Machine Intelligence, vol. 12, No. 8, (Aug. 1990), 721-734.

Feldmar, et al., 3D-2D Projective Registration of Free-Form Curves and Surfaces, Computer Vision and Image Understanding, vol. 65, No. 3, (Mar. 1997), 403-424.

Jain, et al., Object Matching Using Deformable Templates, IEEE Transactions on Pattern Analysis and Machine Intelligence, vol. 18, No. 3, (Mar. 1996), 267-278.

Wells, et al., "Statistical Object Recognition", Submitted to the Department of Electrical Engineering and Computer Science, (Nov. 24, 1992), 1-177.

Zhang, et al., Iterative Point Matching for Registration of Free-Form Curves, (2004), 1-42.

Lu, Shape Registration Using Optimization for Mobile Robot Navigation, Department of Computer Science, University of Toronto, (1995), 1-163 (submitted in 2 parts).

Gennery, Donald B. Visual Tracking of Known Three-Dimensional Objects, International Journal of Computer Vision, (1992), 243-270.

Chew, et al., Geometric Pattern Matching under Euclidean Motion, Computational Geometry, vol. 7, Issues 1-2, Jan. 1997, pp. 113-124, 1997 Published by Elsevier Science B.V.

Alexander, et al., The Registration of MR Images Using Multiscale Robust Methods, Magnetic Resonance Imaging, pp. 453-468, vol. 14, No. 5, 1996.

Anuta, Paul E., Spatial Registration of Multispectral and Multitemporal Digital Imagery Using Fast Fourier Transform Techniques, IEEE Transactions on Geoscience Electronics, pp. 353-368, vol. GE-8, No. 4, Oct. 1970.

Araujo, et al., A Fully Projective Formulation for Lowe's Tracking Algorithm, The University of Rochester Computer Science Department, Technical Report 641, pp. 1-41, Nov. 1996.

Besl, et al., A Method for Registration of 3D Shapes, IEEE Transactions on Pattern Analysis and Machine Intelligence, pp. 239-256, vol. 14, No. 2, Feb. 1992.

Cognex Corporation, Description of Overlap in Cognex search tool and description of Overlap in Cnlpas Tool as of Jul. 12, 1997.

Cognex, Cognex Products on Sale as of one year before Jul. 12, 1997.

Dementhon, et al., Model-Based Object Pose in 25 Lines of Code, International Journal of Computer Vision, pp. 123-141, Kluwer Academic Publishers, Boston, MA, 1995.

Han, et al., An Edge-Based Block Matching Technique for Video Motion, Image Processing Algorithms and Techniques II, pp. 395-408, vol. 1452, 1991.

Hashimoto, et al., High-Speed Template Matching Algorithm Using Information of Contour Points, Systems and Computers in Japan, pp. 78-87, vol. 23, No. 9, 1992.

Lamdan, et al., Affine Invariant Model-Based Object Recognition, IEEE Transactions on Robotics and Automation, pp. 578-589, vol. 6, No. 5, Oct. 1990.

Neveu, et al., Two-Dimensional Object Recognition Using Multiresolution Models, Computer Vision, Graphics, and Image Processing, pp. 52-65, 1986.

Olson, et al., Automatic Target Recognition by Matching Oriented Edge Pixels, IEEE Transactions on Image Processing, pp. 103-113, vol. 6, No. 1, Jan. 1997.

Pratt, William K., Digital Image Processing, Sun Microsystems, Inc., pp. 651-673, 1978.

Seitz, Peter Using Local Orientational Information as Image Primitive for Robust Object Recognition, Visual Communications and Image Processing IV, pp. 1630-1639, vol. 1199, 1989.

Suk, et al., New Measures of Similarity Between Two Contours Based on Optimal Bivarate Transforms, Computer Vision, Graphics and Image Processing 26, pp. 168-182, 1984.

Wunsch, et al., Registration of CAD-Models to Images by Iterative Inverse Perspective Matching, Proceedings of IEEE, 1996 pp. 78-83.

Yamada, Hiromitsu Map Matching-Elastic Shape Matching by Multi-Angled Parallelism, Trans. IEICE Japan D-11, pp. 553-561, vol. J73-D-II, No. 4, Apr. 1990.

* cited by examiner

GENERAL POSE REFINEMENT AND TRACKING TOOL

FIELD OF THE DISCLOSURE

Aspects of the disclosure relate to machine vision. Other aspects relate to the refinement of search results of coarse search methods, and to certain tracking methods.

BACKGROUND

In machine vision systems, a run-time image is often searched for a pattern in the image using a known pattern called a model, a model image, or a template. A result of such a search is called a "pose", which is a transformation that describes the n-dimensional position of the template that provides the closest match to the pattern sought in the run-time image. Thus, the pose maps points from a template (or model, or model image) to points in a run-time image.

It is known to perform a search as a two-step process, including a coarse search, followed by a fine search, the fine search sometimes being called "pose refinement", because the result of the coarse search is a pose. For example, pose refinement is used in PatMax™, sold by Cognex Corporation, Natick Mass. In PatMax™, an initial affine transformation, produced by a coarse search mechanism, is refined by a pose refinement mechanism so as to provide a fine search result.

Affine transformations include translation, uniform scale, and rotation. However, PatMax™ cannot effectively search for patterns that require a non-linear transformation to map from the template to the run-time image. Examples of such non-linear transformations include: thin-plate spline, cone, cylinder, perspective, and polynomial.

There are search mechanisms that can effectively search for patterns that require a non-linear transformation to map from the template to the run-time image. For example, the search mechanism disclosed in U.S. Pat. No. 7,190,834, filed Jul. 22, 2003, entitled "Methods for Finding and Characterizing a Deformed Pattern in an Image" can effectively do such searching. However, the result from such searching as disclosed therein is a coarse search result, and such coarse search results require pose refinement for many applications that require a high degree of accuracy. Consequently, there is a need for a pose refinement mechanism that can effectively refine coarse non-linear search results.

Further, it is known that pose refinement can be used to perform tracking of a pattern in an image that is undergoing transformations over a sequence of images. However, since known pose refinement mechanisms are linear, being limited to performing only affine transformations, many important transformations of patterns in a sequence of run-time images cannot be tracked. In particular, since tracking of moving three-dimensional objects involves the perspective transformation, a form of non-linear transformation, this important transformation cannot be tracked over a sequence of run-time images using known methods.

SUMMARY

Per one embodiment, a method is provided for refining a pose estimate of a model. The model is coarsely aligned with a run-time image, and it represents a two-dimensional model pattern. The pose estimate includes at least one pose estimate parameter. The model has a plurality of model features, and the run-time image has a plurality of run-time features. A given distance value is determined representing a given distance between a given one of the plurality of the model features mapped using a given pose estimate. A two-dimensional model description of the two-dimensional model pattern is provided. The two-dimensional model pattern is mapped using the given pose estimate to create a transformed version of the two-dimensional model pattern. The transformed version represents a non-linear movement of at least portions of the two-dimensional model pattern in a direction orthogonal to a plane of the two-dimensional model description.

BRIEF DESCRIPTION OF THE DRAWINGS

Embodiments of the invention will be more fully understood by reference to the detailed description, in conjunction with the following figures, wherein.

DETAILED DESCRIPTION

Figure 1:
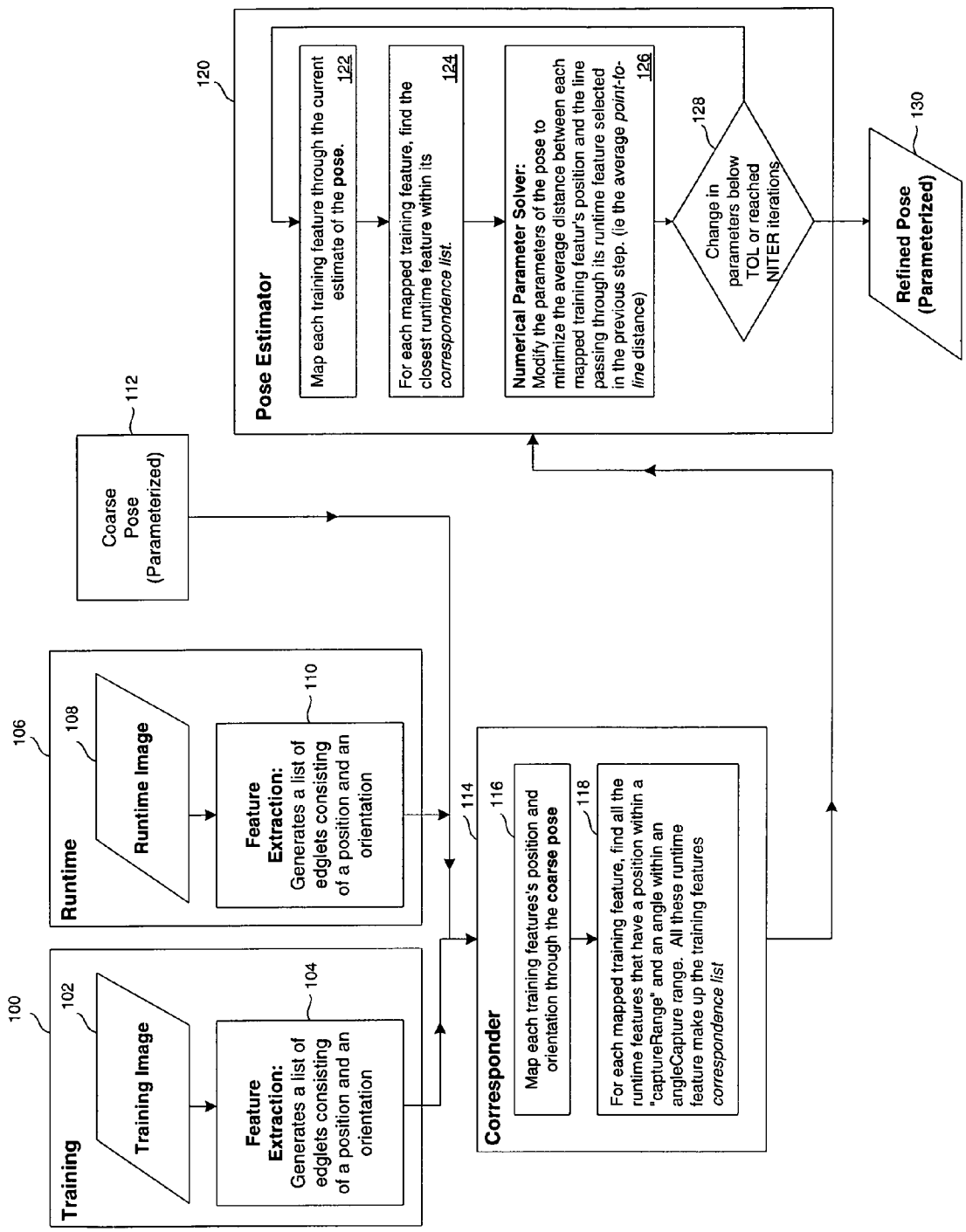
FIG. 1 is a top-level flow diagram showing major phases of an example embodiment method of the invention.

A method of the disclosure takes as input a parameterized coarse pose, which can be found using one of a variety of search methods, both linear and non-linear. The method also takes as input a model, and a run-time image, both providing a plurality of edgelets. Edgelets of the model are then mapped into the run-time image using the coarse pose. Next, the method changes the parameters of the coarse pose incrementally so as to better align the mapped edgelets of the model with the edgelets of the run-time image. This is accomplished by modifying the parameters of the coarse pose such that the point-to-line distance between matched edgelet pairs averaged over all matched edgelet pairs is minimized. The point-to-line distance is the perpendicular distance of the location of the mapped model edgelet to a line co-linear to the run-time image edgelet. Pairs of matched edgelets are determined by determining the closest run-time edgelet for each mapped edgelet using a Euclidean distance calculation. The number of run-time edgelets considered for each mapped edgelet is determined by specifying a capture range in both Euclidean distance between edgelet locations, and angular distance between edgelet orientations.

Embodiments provide pose refinement of the coarse search results of linear, as well as non-linear search methods. Embodiments of disclosure are especially useful as a fine search stage for use with coarse search mechanisms so as to more effectively and accurately search for patterns that require a non-linear transformation to map from a template to a run-time image. Thus, the disclosed embodiments improve the repeatability and accuracy of coarse linear and non-linear search methods. The disclosed embodiments improve the modeling accuracy of a transformation, and can be used with any non-linear transformation, including perspective (three-dimensional poses), thin-plate spline (deformation), cylinder, cone, or any other parameterizable transformation, as well as any affine transformation, including translation, scale, and rotation. Thus, the embodiments can be used with a number of different transformations, employing a stable numerical solver which practically guarantees convergence upon a solution. Also, a method of the disclosure can refine coarse poses that are misaligned by many pixels. In addition, the disclosure can improve on rotation-invariant and scale-invariant search methods by compensating for non-linear distortions of a pattern in an image.

An embodiment can also perform tracking of a pattern in an image that is undergoing transformations over a sequence of images. In this capacity, the invention can track many important transformations of patterns in a sequence of run-time images, such as tracking moving three-dimensional objects using a perspective transformation, a form of non-linear transformation. Consequently, this important transformation can be tracked over a sequence of run-time image frames using the invention, by using the refined pose of a previous frame as the estimated pose for the next frame. The tracking aspect of the invention allows for fast tracking of patterns through a sequence of images.

Accordingly, a first general aspect of the invention is a method for refining a pose estimate of a model coarsely aligned with a run-time image, the pose estimate being characterized by at least one parameter, the model having a plurality of model edgelets, the run-time image having a plurality of run-time edgelets, and each edgelet having a position and an orientation. The method includes mapping the position and orientation of each model edgelet onto the run-time image using the pose estimate to provide a plurality of mapped edgelets. Then, for each mapped edgelet, all run-time features are found having a position within a distance capture range of the mapped edgelet, and having an orientation within an angular capture range of the mapped edgelet, so as to provide a correspondence list of run-time features of the mapped edgelet, thereby providing a plurality of correspondence lists. Next, for each mapped edgelet, a closest run-time edgelet is found within the correspondence list of the mapped edgelet. Then, for each mapped edgelet, a distance is found between the mapped edgelet and the closest run-time edgelet within the correspondence list of the mapped edgelet. Next, the at least one parameter of the pose estimate is modified so as to minimize an average over the plurality of mapped edgelets of the distance between each mapped edgelet and the closest run-time edgelet within the correspondence list of the mapped edgelet.

In a preferred embodiment, the distance is the point-to-line distance between the mapped edgelet and the closest run-time edgelet within the correspondence list of the mapped edgelet.

In another preferred embodiment, the at least one parameter of the pose estimate is modified so as to minimize an average over the plurality of mapped edgelets of the distance proceeds as an iterative loop. In a further preferred embodiment, the iterative loop is terminated when a number of iterations of the iterative loop reaches a maximum number of iterations. In an alternate embodiment, the iterative loop is terminated when the average over the plurality of mapped edgelets of the distance is less than an average distance threshold. In yet another alternate embodiment, the iterative loop is terminated when a change in the at least one parameter per iteration is less than a change threshold.

In another embodiment, the method also includes performing data-reduction on the model prior to mapping the position and orientation of each model edgelet. In a preferred embodiment, performing data-reduction includes chaining model edgelets, and discarding edgelets not included in a chain of edgelets. In a further preferred embodiment, performing data-reduction includes discarding every $n^{th}$ edgelet, where n is an integer selected so as to reduce computation overhead while preserving sufficient accuracy for an application to which the method is applied.

In another preferred embodiment, the plurality of model edgelets are obtained by first sub-sampling a model image to provide a sub-sampled model image, and then edge detecting the sub-sampled model image to provide a model having a plurality of edgelets.

In yet another preferred embodiment, modifying the at least one parameter of the pose estimate includes computing a search direction in pose parameter space; and incrementing the pose parameter in the search direction in pose parameter space. In a further preferred embodiment, the search direction is in the direction of one of: gradient and robust gradient.

In another preferred embodiment, the distance capture range of the mapped edgelet is sized so as to capture some run-time image edgelets in portions of a run-time image having an edge, and so as not to capture any run-time image edgelets in portions of the run-time image not having an edge.

In other preferred embodiments, the average is an arithmetic average, or a root mean squared average. In yet other preferred embodiments, the pose estimate is a non-linear pose estimate. In a further preferred embodiment, the non-linear pose estimate is a non-linear transformation selected from the group including: perspective, cylinder, cone, polynomial, and thin-plate spline.

In another preferred embodiment, modifying the at least one parameter of the pose estimate so as to minimize an average over the plurality of mapped edgelets of the distance proceeds as an iterative loop, the iterative loop using only run-time image edgelets that are located within a consider range of each mapped edgelet that was mapped by the pose estimate prior to the iterative loop. In a further preferred embodiment, each iteration of the iterative loop uses only run-time edgelets that are within a capture range of each mapped edgelet that was mapped by a current estimate of the pose, and the capture range is sized smaller than the consider range so as to effectively reduce the influence of outliers and spurious run-time image edgelets.

Another general aspect of the invention is a method for refining a pose estimate of a model coarsely aligned with a run-time image, the pose estimate being characterized by at least one parameter. The method includes providing a pose estimate to be refined, the pose estimate being characterized by at least one parameter; extracting edgelets from a model image so as to provide a model having a plurality of model edgelets, each model edgelet having a position and an orientation; extracting edgelets from the run-time image so as to provide a plurality of run-time edgelets, each run-time edgelet having a position and an orientation; mapping the position and orientation of each model edgelet onto the run-time image using the pose estimate to provide a plurality of mapped edgelets; pairing each mapped edgelet with a run-time edgelet to provide a plurality of edgelet pairs; for each edgelet pair, finding a distance between the mapped edgelet and the run-time edgelet paired with the mapped edgelet; and modifying at least one parameter of the pose estimate so as to minimize an average over the plurality of edgelet pairs of the distance between the mapped edgelet and the run-time edgelet paired with the mapped edgelet.

In a preferred embodiment, the run-time edgelet of an edgelet pair is selected from a plurality of run-time edgelets. In another preferred embodiment, pairing each mapped edgelet with a run-time edgelet includes finding all run-time features having a position within a distance capture range of the mapped edgelet, and having an orientation within an angular capture range of the mapped edgelet, so as to provide a correspondence list of run-time features of the mapped edgelet, thereby providing a plurality of correspondence lists; and finding a closest run-time edgelet within the correspondence list of the mapped edgelet.

In another preferred embodiment, extracting features from the model image includes sub-sampling the model image to provide a sub-sampled model image, and detecting edges in the sub-sampled model image to provide a model having a plurality of edgelets.

Another general aspect of the invention is a method for refining a non-linear pose estimate of a model coarsely aligned with a run-time image, the non-linear pose estimate being characterized by at least one parameter, the model having a plurality of model edgelets, the run-time image having a plurality of run-time edgelets, each edgelet having a position and an orientation. This method includes modifying the at least one parameter of the pose estimate so as to minimize an average distance taken over a plurality of model edgelets mapped by the pose estimate, the distance being the distance between each model edgelet mapped by the pose estimate, and a corresponding run-time edgelet.

In a preferred embodiment, the corresponding run-time edgelet is the run-time edgelet that is closest to the model edgelet mapped by the pose estimate. In an alternate preferred embodiment, the corresponding run-time edgelet is the run-time edgelet that is closest to the model edgelet mapped by the pose estimate, and also falls within a capture range. In a further preferred embodiment, the capture range includes both a distance capture range, and an angle capture range. In another preferred embodiment, each corresponding edgelet is included in a correspondence list. In a further preferred embodiment, the correspondence list is a list of lists. In a preferred embodiment, modifying the at least one parameter of the pose estimate is performed iteratively.

Another general aspect of the invention is a method for tracking the motion of a pattern in an image undergoing a non-linear deformation over a sequence of images. This method includes providing a current pose of a model aligned with a first image of the sequence, the current pose being a non-linear transformation characterized by at least one parameter; providing a second image of the sequence of images, the second image having a plurality of second image edgelets, each second image edgelet having a position and an orientation; mapping the position and orientation of each model edgelet onto the second image using the current pose of the model in the first image to provide a plurality of mapped edgelets; for each mapped edgelet, finding all second image features having a position within a distance capture range of the mapped edgelet, and having an orientation within an angular capture range of the mapped edgelet, so as to provide a correspondence list of run-time features of the mapped edgelet, thereby providing a plurality of correspondence lists; for each mapped edgelet, finding a closest run-time edgelet within the correspondence list of the mapped edgelet; for each mapped edgelet, finding a distance between the mapped edgelet and the closest second image edgelet within the correspondence list of the mapped edgelet; and modifying the at least one parameter of the current pose so as to minimize an average over the plurality of mapped edgelets of the distance between each mapped edgelet and the closest second image edgelet within the correspondence list of the mapped edgelet, thereby providing an updated pose.

In a preferred embodiment, the distance is the point-to-line distance between the mapped edgelet and the closest second image edgelet within the correspondence list of the mapped edgelet. In another preferred embodiment, modifying the at least one parameter proceeds as an iterative loop. In a further preferred embodiment, the iterative loop is terminated when a number of iterations of the iterative loop reaches a maximum number of iterations. In another further preferred embodiment, the iterative loop is terminated when the average over the plurality of mapped edgelets of the distance is less than an average distance threshold. In yet another further preferred embodiment, the iterative loop is terminated when a change in the at least one parameter per iteration is less than a change threshold.

In another embodiment, the method further includes performing data-reduction on the model prior to mapping the position and orientation of each model edgelet. In a further preferred embodiment, performing data-reduction includes chaining model edgelets, and discarding edgelets not included in a chain of edgelets. In another further preferred embodiment, performing data-reduction includes discarding every $n^{th}$ edgelet, where n is an integer selected so as to reduce computation overhead while preserving sufficient accuracy for an application to which the method is applied.

In a preferred embodiment, the plurality of model edgelets are obtained by first sub-sampling a model image to provide a sub-sampled model image, and then edge detecting the sub-sampled model image to provide a model having a plurality of edgelets.

In another preferred embodiment, modifying the at least one parameter of the pose estimate includes computing a search direction in pose parameter space, and incrementing the pose parameter in the search direction in pose parameter space. In a further preferred embodiment, the search direction is in the direction of one of: gradient and robust gradient.

In another preferred embodiment, the distance capture range of the mapped edgelet is sized so as to capture some run-time image edgelets in portions of a run-time image having an edge, and so as not to capture any run-time image edgelets in portions of the run-time image not having an edge.

In still other preferred embodiment, the average is an arithmetic average, or a root mean squared average.

In yet another preferred embodiment, the pose estimate is a non-linear pose estimate. In a further preferred embodiment, the non-linear pose estimate is a non-linear transformation selected from the group including: perspective, cylinder, cone, polynomial, and thin-plate spline.

With reference to FIG. 1, during a training phase 100, a model image 102, also called a training image 102, is acquired. Such an image can be acquired using a machine vision camera, or can be synthetically created. Next, features are extracted 104. The features are preferably edgelets. Thus, feature extraction results in a list of edgelets, each edgelet having a position and an orientation. Edgelet extraction can be performed using Sobel edge detection, for example, as is well-known in the art. Other edge detection methods can be used, such as "Apparatus and Method for Detecting and Subpixel Location of Edges in a Digital Image", U.S. Pat. No. 6,408,109. This method is useful in high-precision applications. In some applications, it is also preferred to perform sub-sampling of the model image 102 prior to edge detection 104. The data reduction provided by sub-sampling can improve the computational speed of the method, and provide improved performance.

Further data reduction can be performed upon the list of edgelets, such as simply discarding every other edgelet, or some other systematic scheme for retaining and/or discarding edgelets. Also, more intelligent methods for discarding edgelets can be employed, such as first chaining the edgelets, and then discarding chains that are shorter than a minimum length. Such data reduction can improve the speed, without impairing the accuracy of the method. There are many other methods for discarding edgelets known in the art of machine vision that will improve the speed, without appreciably degrading accuracy of the method. The method used will depend somewhat on the particular application.

The result of the sub-sampling of a model image, edge detection, and data reduction is a list of edgelets that, taken together, can be used as a model.

Alternatively, a model can be a list of edgelets obtained in some other way, such as by a model synthesizer that can create models of shapes specified by one or more parameters, and derive a list of model edgelets corresponding to the shape, for example. Or, a list of model edgelets can simply be provided.

Figure 3:
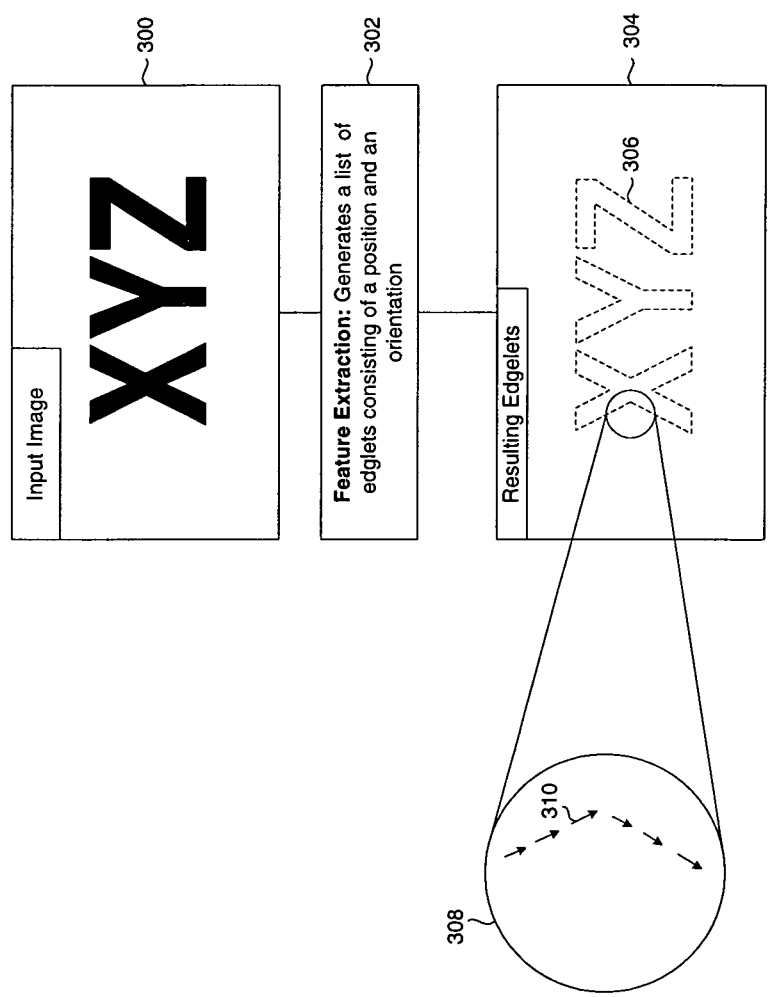
FIG. 3 is a graphical representation of Feature Extraction from an input model (training) image, and the resulting edgelets.

Details of feature extraction 104 are shown in FIG. 3, wherein an input image 300 is processed using edge extraction 302 so as to extract edgelets 304, represented by dashed lines 306. A close-up view 308 of the edgelets is provided, revealing by the sequence of arrows 310 that each edgelet 310 has a position and an orientation.

Similarly, at run-time 106, a run-time image 108 is acquired, such as by using a machine vision camera. As was done for the acquired training image 102, features are extracted 110. Preferably, the features are edgelets, and the result of the feature extraction 110 is a list of run-time edgelets. As in the training phase, sub-sampling prior to edge detection, and data reduction by systematically reducing the number of run-time edgelets can improve speed and/or accuracy of the method.

Figure 4:
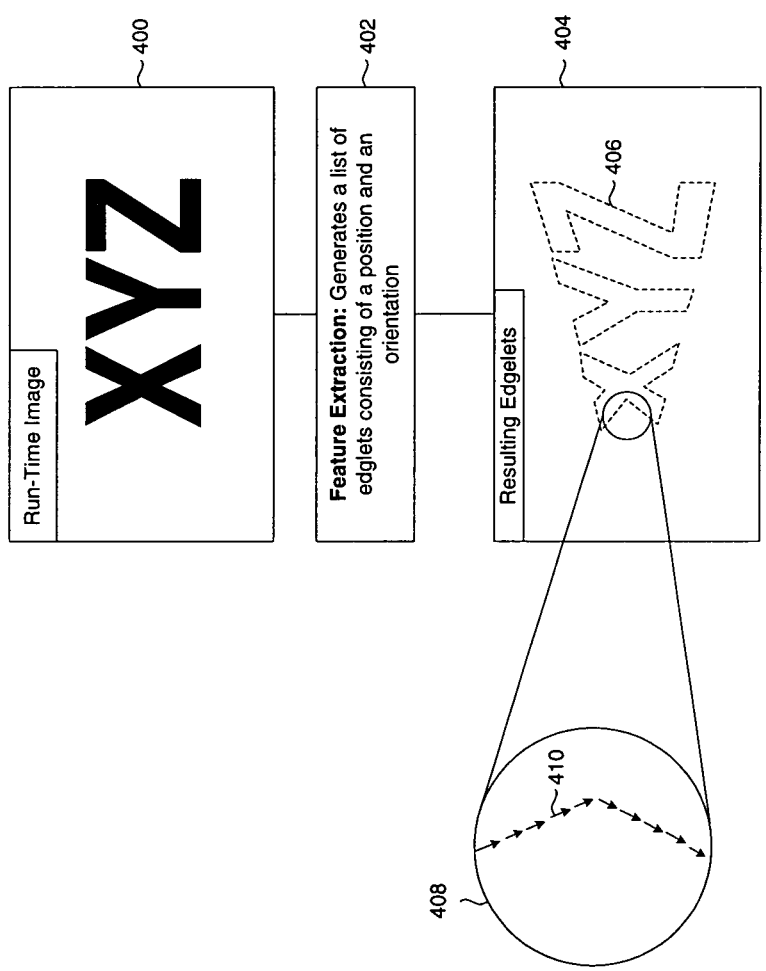
FIG. 4 is a graphical representation of Feature Extraction from an input run-time image, and the resulting edgelets.

Referring to FIG. 4, details of feature extraction 402 from a run-time image 400 are shown. The resulting edgelets 404, shown as short dashes 406, each are characterized by a position and an orientation. The close-up view 408 shows a sequence of edgelets 410 as might result from edgelet chaining. Such chaining is a form of data reduction that can further improve the performance of the method.

In the next phase, called the corresponder 114, the list of model edgelets, the list of run-time edgelets, and a parameterized coarse pose 112 are used to create a correspondence list, which is the output of the corresponder 114. The correspondence list is actually a list of lists, which will now be explained.

Figure 5:
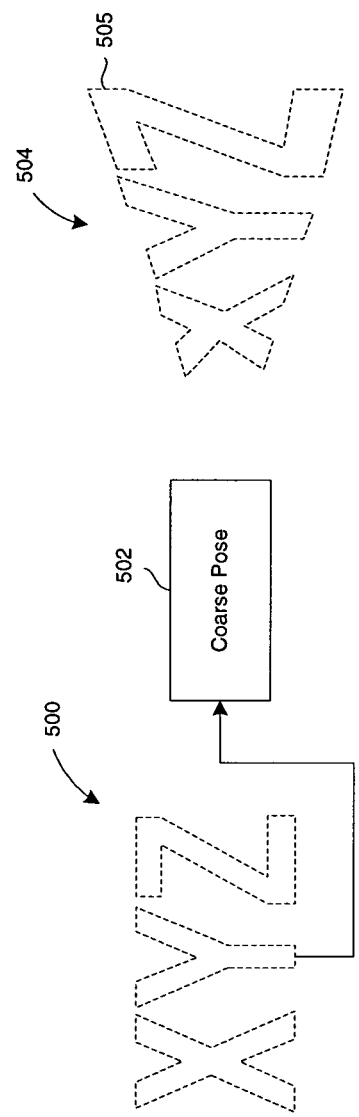
FIG. 5 is a graphical representation of model (training) edgelets mapped by a coarse pose into mapped model (training) edgelets.

A first step in the corresponder 114 is the step 116 wherein each model (training) edgelet is mapped using the parameterized coarse pose 112. This step 116 is illustrated in FIG. 5, wherein a plurality of model edgelets 500 are mapped using the coarse pose 502 so as to provide a plurality of mapped edgelets 504, as shown.

A second step in the corresponder 114 is the step 118. In this step 118, for each mapped edgelet 505 in the plurality of mapped edgelets 504, all run-time features 406 are found that have a position within a position capture range of the mapped edgelet 505, and an orientation within an angle capture range of the mapped edgelet 505. This is best understood by reference to FIG. 6.

Figure 6:
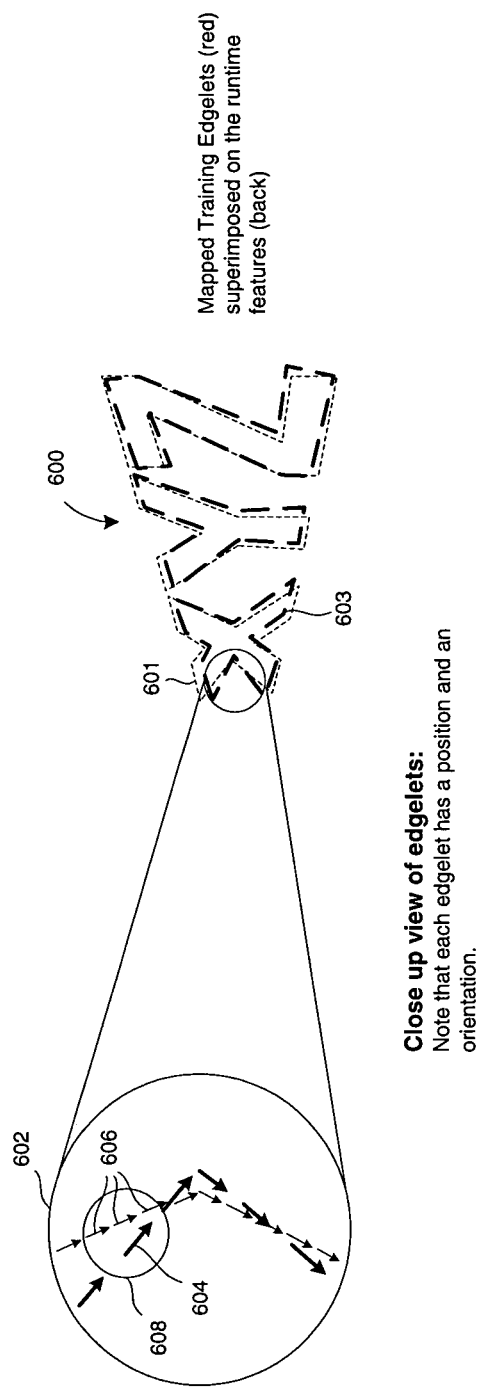
FIG. 6 is a graphical representation of mapped model (training) edgelets superimposed on run-time edgelets, including a close-up of a mapped edgelet, it's capture range, and the run-time edgelets within the capture range.

In FIG. 6, the plurality of run-time edgelets 601 (long black dashes) is overlaid upon the plurality of mapped edgelets 603 (short grey dashes), as shown at 600. An enlargement 602 shows a mapped edge (grey arrow) 604 among a plurality (possibly a chain) of mapped edgelets. Also shown in the enlargement 602 are a plurality 606 of run-time edgelets that fall within a capture range 608 of the mapped edgelet 604. Only the run-time edgelets 606 that fall within the capture range 608 are included in the correspondence list that is created by the corresponder 114. In a preferred embodiment, the run-time edgelets 606 must also each have an orientation that falls within an angle capture range of the mapped edgelet 604 to be included in the correspondence list associated with the mapped edgelet 604.

A "correspondence list" is actually a list of lists, one list for each mapped edgelet. The contents of each list associated with a mapped edgelet is a plurality of run-time edgelets. Each run-time edgelet on the list falls within both the position capture range 608, and the angle capture range (not shown). Any run-time edgelet that falls outside either the position capture range 608 of the mapped edgelet 604, or the angle capture range (not shown) of the mapped edgelet 604, does not get included in the list associated with the mapped edgelet 604. Thus, the entire correspondence list is a collection of all the lists associated with all the mapped edgelets. This list of lists is the output of step 118 that is provided to the pose estimator 120.

Figure 7:
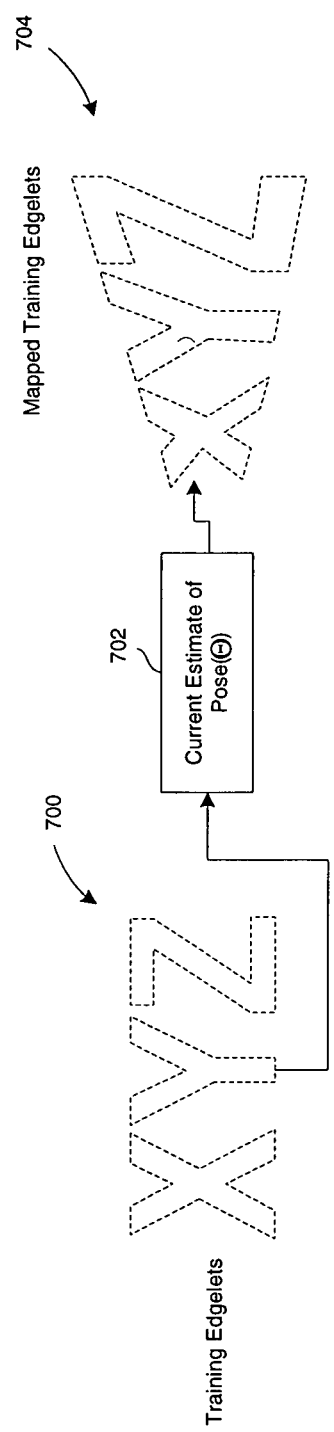
FIG. 7 is a graphical representation (training) edgelets mapped by a current estimate of the pose to create mapped edgelets.

In the pose estimator 120 of FIG. 1, another mapping of model edgelets is performed 122. Referring to FIG. 7, this time, the pose used for the mapping is the "current estimate" of the pose 702. The current estimate is the most recently updated estimate, wherein the pose is updated in the pose estimator 120 as part of an iterated loop through steps 122, 124, 126, and 128, to be discussed below. Analogous to the mapping shown in FIG. 5, model edgelets 700 are mapped 702 using the current estimate of the pose of the model to provide a plurality of mapped model edgelets 704.

Figure 8:
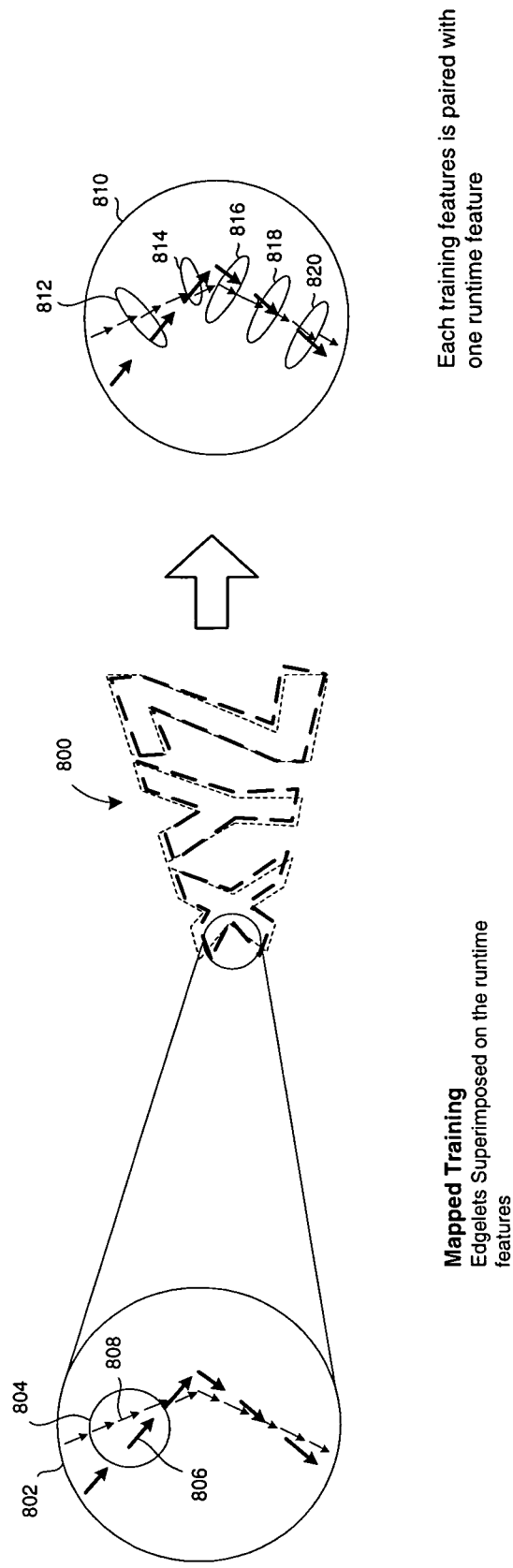
FIG. 8 is a graphical representation of mapped edgelets superimposed upon run-time edgelets, also showing how each mapped edgelet is paired with one run-time edgelet within a capture range of the mapped edgelet.

In step 124 of FIG. 1, for each mapped model edgelet, the closest run-time feature that falls within both a distance capture range and an angle capture range is found. This results in a plurality of edgelet pairs, each pair having a mapped model edgelet and a run-time edgelet. FIG. 8 shows the superposition of mapped edgelets (grey points) on run-time edgelets (black long dashes).

The close-up view 802 again shows a single mapped edgelet 806 and the run-time edgelets within the capture range 804 that are included on a list of the correspondence list. The run-time edgelet 808 is selected as being the closest to the mapped edgelet 806.

The list-of-lists nature of the correspondence list is illustrated in the close-up view 810, where a plurality of capture ranges 812, 814, 816, 818, and 820 are shown, each capture range resulting in a list of run-time edgelets to be included in the correspondence list. Note also in FIG. 8 that each capture range 812, 814, 816, 818, and 820 shows only a pair of edgelets, one run-time edgelet and one mapped edgelet. This pair of edgelets represents a mapped edgelet, and the closest run-time edgelet within the capture range of the paired mapped edgelet. Note as well that for each pair of edgelets, there is a distance to be computed. In the numerical parameter solver 126, this distance between the two edgelets of each edgelet pair is computed.

Figure 9:
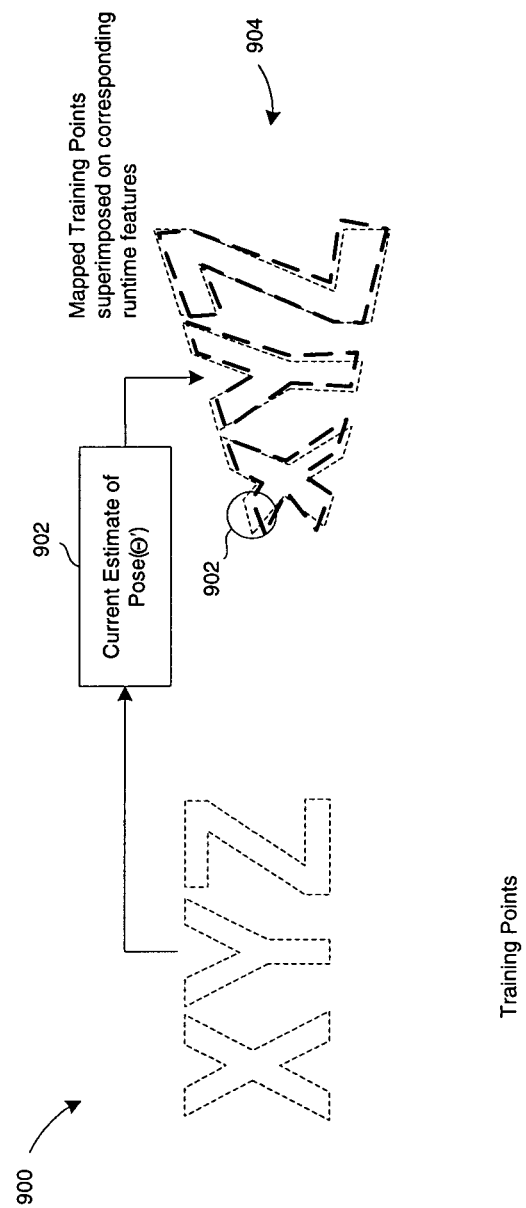
FIG. 9 is a graphical representation of model (training) points mapped by a coarse pose, and then superimposed upon corresponding runtime edgelets.

In the numerical parameter solver 126, the parameters of the current estimate of the pose of 122 are modified so as to minimize an average, taken over all the pairs, of the distance between each mapped edgelet's position and the line passing through its closest run-time edgelet that was selected in step 124. FIG. 9 shows how model points (grey dashes) 900 of the model edgelets are mapped 902 by the coarse pose onto the corresponding run-time edgelets (black dashes) 904. The close-up 906 shows that there is some room for refining the coarse pose so as to decrease the aggregate distance between the mapped training points (grey dots) and the run-time edgelets (black dashes). The distance between a mapped edgelet and a run-time edgelet can be calculated as a "point-to-line" distance, as shown in FIG. 10.

Figure 10:
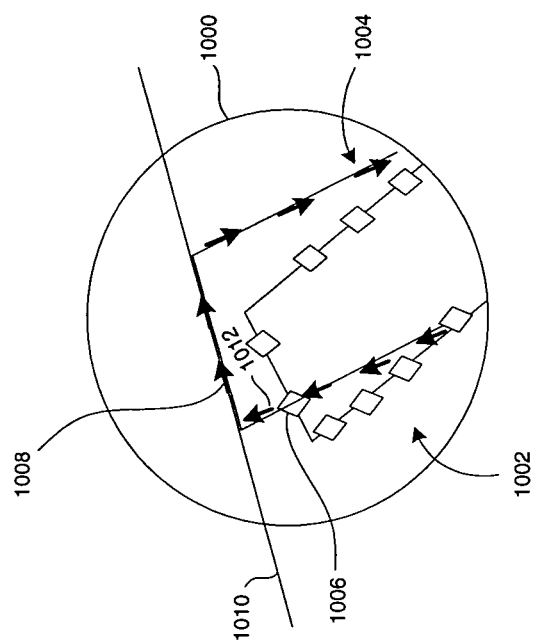
FIG. 10 is a graphical representation of mapped points (shown as diamonds), run-time edgelets, and a point-to-line distance between a mapped point, and a line collinear with a run-time edgelet.

In FIG. 10, a close-up view 1000 shows a plurality of mapped edgelet points (i.e., only the position of each mapped edgelet, not its orientation) 1002. A distance, i.e., the point-to-line distance, between a particular mapped edgelet point 1006 and a run-time edgelet 1008 is computed by determining a line 1010 that is co-linear with the run-time edgelet 1008, and then determining the perpendicular distance 1012 between the line 1010 and the point 1006.

The point-to-line distance $d_j$ can be described by Equation 1:

$$d_j = \text{Dist}(\text{Pose}(\Phi) * p_j, \text{line}_j)$$

$$= \hat{n}_j \cdot p'_j - b_j$$

where $\hat{n}_j$ is the normal of the $j^{th}$ line, $p'_j$ is the mapped model point, and $b_j$ is the distance of the $j^{th}$ line from the origin.

(Collecting these distances in a vector d results in Equation 2:

$$d = \lfloor d_j \rfloor$$

Next, in step 128, if the change in the parameters of the pose falls below a minimum threshold (here called TOL), or if the number of iterations (here called NITER) reaches a maximum threshold, or if the average distance (or other function of the point-to-line distances) falls below a threshold, then the current estimate of the pose is returned and the method terminates 130. The change in the parameters of the pose can be calculated as the change in the sum of the parameters of the pose, such as the root-mean-square sum, or the simple sum, or the average, for example.

Figure 2:
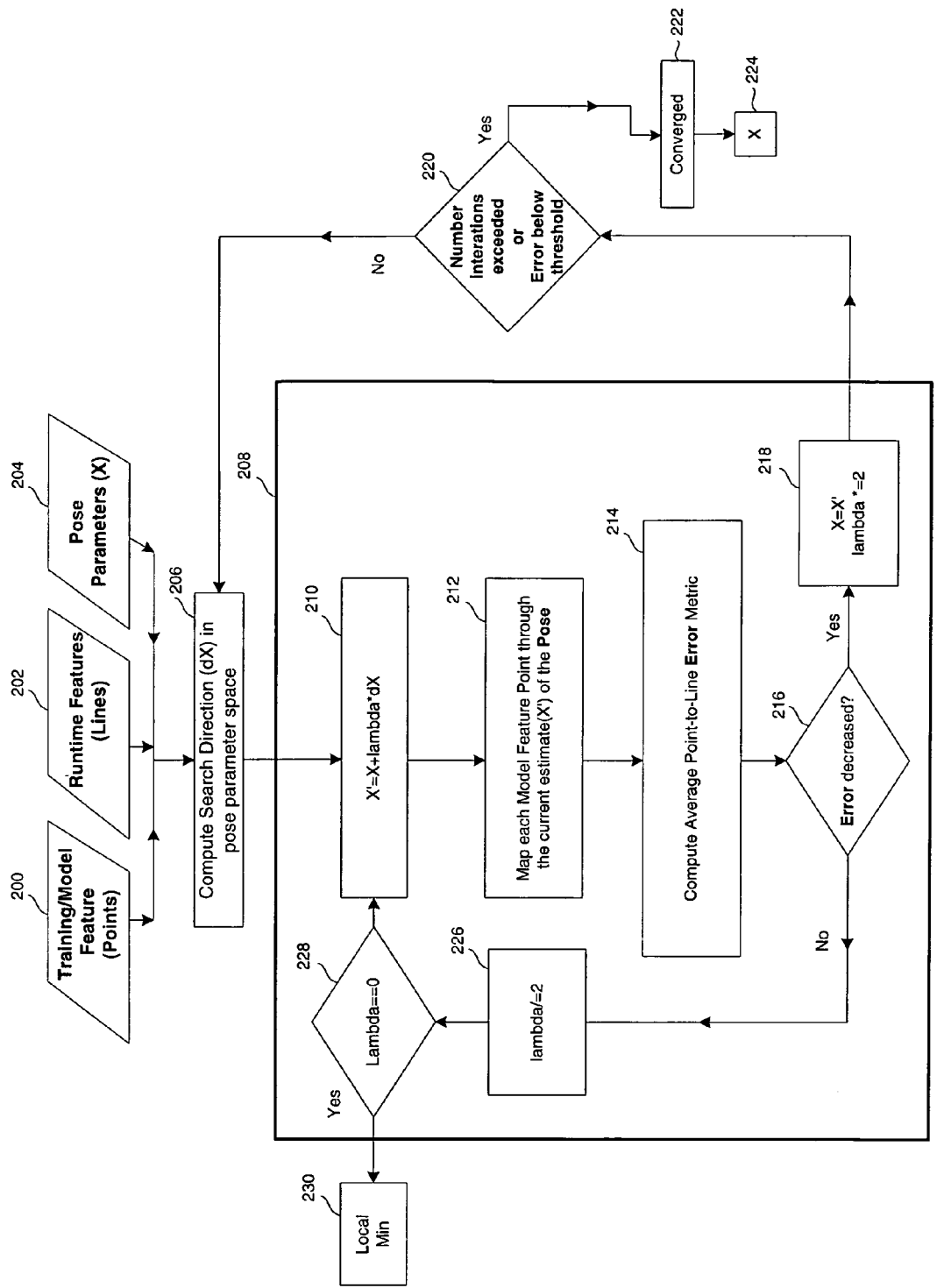
FIG. 2 is a flow diagram of the Numerical Parameter Solver of FIG. 1.

Referring to FIG. 2, further detail on the functioning of the Numerical Parameter Solver 126 of FIG. 1 will now be provided. The model points 200 of the model edgelets, the run-time edgelets 202, and the parameters 204 of the pose are provided for computing the search direction dX in pose parameter space 206.

In general, an error metric is some function of the distance d:

$$\text{error} = \text{Function}(d)$$

The search direction dX is found at step 206 by taking a partial derivative of the error with respect to the $i^{th}$ parameter of the pose:

$$\partial\Theta = \left[\frac{\partial \text{error}}{\partial \theta_i}\right] = \begin{bmatrix} \text{Partial Derivitive of the} \\ \text{error with respect to the} \\ i^{th} \text{ parameter of the pose} \end{bmatrix} \quad \text{(Equation A)}$$

In the case of the sum of squared distances error metric we define the error to be:

$$\text{error} = \sum_j d_j^2 = d^T d$$

Using Equation A we get the following result:

$$J = [j_{ij}] = \left[\frac{\partial d_i}{\partial \theta_j}\right] = \begin{bmatrix} \text{Partial Derivitive of } i^{th} \text{ distance} \\ \text{with respect to the } j^{th} \text{ parameter} \\ \text{of the pose.} \end{bmatrix}$$

$$J = \left[2\frac{\partial(\hat{n}_i \cdot p'_i - b_i)}{\partial \theta_j}\right] = \left[2\hat{n}_i \frac{\partial(\text{Pose}(\Theta) * p_i)}{\partial \theta_j}\right]$$

$$\partial\Theta = J^T d$$

In the case of the thresholded distances metric, a cap is placed on the maximum distance that a point can be from a line, and define the error to be:

$$\tilde{d}_j = \min(d_j, \text{maxConsider}) \quad \text{error} = \sum_j (\tilde{d}_j)^2$$

Using equation (A) again we get the following result:

$$J = [j_{ij}] = \left[\frac{\partial d_i}{\partial \theta_j}\right] = \begin{bmatrix} \text{Derivitive of } i^{th} \text{ thresholded} \\ \text{distance with respect to the } j^{th} \\ \text{parameter of the pose.} \end{bmatrix}$$

$$J = [j_{ij}] = \begin{cases} n_i \cdot \frac{\partial(\text{Pose}(\Theta) * p_i)}{\partial \theta_j} & \text{if } d_j \leq \text{maxConsider} \\ 0 & \text{if } d_j \leq \text{maxConsider} \end{cases}$$

$$\partial\Theta = J^T d$$

After the search direction has been computed at 206, the parameter space in the computed search direction is searched at 208 until the number of iterations exceeds a threshold, or until the error metric falls below a threshold 220, and the method thereby converges 222, whereupon the refined parameterized pose is returned 224, or until the method determines that a local minimum in the parameter space has been reached 230, at which point the parameterized pose can also be returned. Thresholds are application-dependent, and are therefore determined empirically to achieve desired results.

To search the parameter space in the direction of the computed search, a value for lambda is selected at step 210, and that value for lambda is multiplied by dX, i.e., $J^T d$, and then added to the current pose estimate X to get the new current pose estimate X'. Lambda can start at $2^{-4}$, for example.

Next, each model edgelet point is mapped 212 using the new current estimate X' of the pose. Then, the average point-to-line error metric is computed 214, such as by computing the average distance. In some applications, it is useful to exclude outliers when computing distance.

If the error metric has decreased due to the change in lambda at 210, then lambda is multiplied by 2 at step 218. Else, lambda is divided by 2 at step 226 If lambda falls below a threshold, or if some number (e.g., 10) of iterations has been reached, as determined at 228, then a local minimum has been reached.

If the error metric has been decreased such that the number of iterations exceeds a threshold, or such that the error metric falls below a threshold 220, the method is deemed to have converged 222, whereupon the refined parameterized pose is returned 224.

Step 206 and the steps of 208 represent a method of searching pose parameter space so as to minimize an aggregate distance metric over all pairs of mapped model points and run-time edgelets. Other approaches to computing an aggregate distance would achieve the same result, as would other methods of minimizing the aggregate distance metric so as to provide a refined parameterized pose.

To further improve performance and robustness, not all run-time image edgelets are used in the refinement loop of 208. Instead, the only run-time image edgelets that are used are those located within a "consider range" of each mapped edgelet that was mapped by the pose estimate prior to refinement by the iterative loop. In addition, each iteration of the iterative loop uses only run-time edgelets that are within a "capture range" of each mapped edgelet that was mapped by a current estimate of the pose.

To effectively reduce the influence of outliers and spurious run-time image edgelets, the capture range is sized smaller than the consider range. Using both a consider range and a smaller capture range allows the pose to attract to far away features, while not being effected by outliers and spurious edgelets. For example, the consider range could be 10-20 pixels, while the capture range could be 5 pixels. This is another example of how data reduction can improve the performance and robustness of the disclosed method, but other methods of data reduction, whether in the alternative to, or in addition to, those discussed herein, can also improve the performance and robustness of the method.

Embodiments have been discussed in the context of pose refinement, and particularly in the context of non-linear pose refinement. This can open up significant new applications, such as tracking. One reason for this is that the perspective transformation which is used when tracking three-dimensional objects is a non-linear transformation. So, the disclosed embodiment method for refining a non-linear pose can be easily adapted for tracking the motion of objects in three-dimensional space. In this case, the motion of an object is represented by a sequence of image frames, much like a sequence of frames of movie film, where an image is captured once ever thirtieth of a second, for example.

Application of a pose refinement method of the disclosure to tracking an object as it deforms or experiences movement relative to a camera may be accomplished in an extremely efficient manner by using the refined pose of a previous frame as the pose estimate initial estimate for the next frame.

Note that tracking refers to a situation where there is a sequence of images of the same object, either from different views, or from the same view as the object undergoes deformation. Thus, the different views can be due to motion in three-dimensions of either the camera or the object, resulting in a changing perspective image. Also note that the method of the disclosure is advantageous when each successive frame is substantially similar to the previous frame, i.e. the deformation or perspective change that occurs between each pair of frames in an image sequence is not too large, even if the total deformation or perspective change over the entire sequence is large. Tracking according to the disclosure can be very efficient and fast, and is useful in robotics, security, and in control applications.

Other modifications and implementations will occur to those skilled in the art without departing from the spirit and the scope of the invention as claimed. Accordingly, the above description is not intended to limit the invention except as indicated in the following claims.

The invention claimed is:

1. A method for refining a pose estimate of a model coarsely aligned with a run-time image, the pose estimate having at least one parameter, the model having a plurality of model edgelets, the run-time image having a plurality of run-time edgelets, each edgelet having a position and an orientation, the method comprising:
   mapping the position and orientation of each model edgelet onto the run-time image using the pose estimate to provide a plurality of mapped edgelets;
   for each mapped edgelet, finding all run-time features having a position within a distance capture range of the mapped edgelet, and having an orientation within an angular capture range of the mapped edgelet, and having an orientation within an angular capture range of the mapped edgelet, so as to provide a correspondence list of run-time features of the mapped edgelet, thereby providing a plurality of correspondence lists;
   for each mapped edgelet, finding a closest run-time edgelet within the correspondence list of the mapped edgelet;
   for each mapped edgelet, finding a distance between the mapped edgelet and the closest run-time edgelet within the correspondence list of the mapped edgelet; and
   modifying the at least one parameter of the pose estimate so as to minimize an average over the plurality of mapped edgelets of the distance between each mapped edgelet and the closest run-time edgelet within the correspondence list of the mapped edgelet.

2. The method of claim 1, wherein the distance is the point-to-line distance between the mapped edgelet and the closest run-time edgelet within the correspondence list of the mapped edgelet.

3. The method of claim 1, wherein modifying the at least one parameter of the pose estimate so as to minimize an average over the plurality of mapped edgelets of the distance proceeds as an iterative loop.

4. The method of claim 3, wherein the iterative loop is terminated when a number of iterations of the iterative loop reach a maximum number of iterations.

5. The method of claim 3, wherein the iterative loop is terminated when the average over the plurality of mapped edgelets of the distance is less than an average distance threshold.

6. The method of claim 3, wherein the iterative loop is terminated when a change in the at least one parameter per iteration is less than a change threshold.

7. The method of claim 1, further comprising:
   performing data-reduction on the model prior to mapping the position and orientation of each model edgelet.

8. The method of claim 7, wherein performing data-reduction includes chaining model edgelets, and discarding edgelets not included in a chain of edgelets.

9. The method of claim 7, wherein performing data-reduction includes discarding every $n^{th}$ edgelet, where n is an integer selected so as to reduce computation overhead while preserving sufficient accuracy for an application to which the method is applied.

10. The method of claim 1, wherein the plurality of model edgelets are obtained by first sub-sampling a model image to provide a sub-sampled model image, and then edge detecting the sub-sampled model image to provide a model having a plurality of edgelets.

11. The method of claim 1, wherein modifying the at least one parameter of the pose estimate includes:
   computing a search direction in pose parameter space; and
   incrementing the pose parameter in the search direction in pose parameter space.

12. the method of claim 11, wherein the search direction is in the direction of one of gradient and robust gradient.

13. The method of claim 1, wherein the distance capture range of the mapped edgelet is sized so as to capture some run-time image edgelets in portions of a run-time image having an edge, and so as not to capture any run-time image edgelets in portions of the run-time image not having an edge.

14. The method of claim 1, wherein the average is an arithmetic average.

15. The method of claim 1, wherein the average is a root mean squared average.

16. The method of claim 1, wherein the pose estimate is a non-linear pose estimate.

17. the method of claim 16, wherein the non-linear pose estimate is a non-linear transformation selected from the group including:
perspective, cylinder, cone, polynomial, and thin-plate spline.

18. The method of claim 1, wherein modifying the at least one parameter of the pose estimate so as to minimize an average over the plurality of mapped edgelets of the distance proceeds as an iterative loop,
the iterative loop using only run-time image edgelets that are located within a consider range of each mapped edgelet that was mapped by the pose estimate prior to the iterative loop.

19. The method of claim 18, wherein each iteration of the iterative loop uses only run-time edgelets that are within a capture range of each mapped edgelet that was mapped by a current estimate of the pose, and
the capture range is sized smaller than the consider range so as to effectively reduce the influence of outliers and spurious run-time image edgelets.

20. A method for refining a pose estimate of a model coarsely aligned with a run-time image, the pose estimate including at least one parameter, the method comprising:
providing a pose estimate to be refined, the pose estimate being characterized by at least one parameter;
extracting edgelets from a model image so as to provide a model having a plurality of model edgelets, each model edgelet having a position and an orientation;
extracting edgelets from the run-time image so as to provide a plurality of run-time edgelets, each run-time edgelet having a position and an orientation;
mapping the position and orientation of each model edgelet onto the run-time image using the pose estimate to provide a plurality of mapped edgelets;
pairing each mapped edgelet with a run-time edgelet to provide a plurality of edgelet pairs;
for each edgelet pair, finding a distance between the mapped edgelet and the run-time edgelet paired with the mapped edgelet; and
modifying at least one parameter of the pose estimate so as to minimize an average over the plurality of edgelet pairs of the distance between the mapped edgelet and the run-time edgelet paired with the mapped edgelet.

21. The method of claim 20, wherein the run-time edgelet of an edgelet pair is selected from a plurality of run-time edgelets.

22. The method of claim 20, wherein pairing each mapped edgelet with a run-time edgelet includes:
finding all run-time features having a position within a distance capture range of the mapped edgelet, and having an orientation within an angular capture range of the mapped edgelet, so as to provide a correspondence list of run-time features of the mapped edgelet, thereby providing a plurality of correspondence lists; and
finding a closet run-time edgelet within the correspondence list of the mapped edgelet.

23. The method of claim 20, wherein extracting features from the model image includes:
sub-sampling the model image to provide a sub-sampled model image; and
detecting edges in the sub-sampled model image to provide a model having a plurality of edgelets.

24. A method for refining a non-linear pose estimate of a model coarsely aligned with a run-time image, the non-linear pose estimate having at least one parameter, the model having a plurality of model edgelets, the run-time image having a plurality of run-time edgelets, each edgelet having a position and an orientation, the method comprising:
modifying the at least one parameter of the pose estimate so as to minimize an average distance taken over a plurality of model edgelets mapped by the pose estimate, the distance being the distance between each model edgelet mapped by the pose estimate and a corresponding run-time edgelet;
wherein the corresponding run-time edgelet is the run-time edgelet that is closest to the model edgelet mapped by the pose estimate;
wherein the corresponding run-time edgelet is the run-time edgelet that is closest to the model edgelet mapped by the pose estimate, and also falls within a capture range; and
wherein the capture range includes both a distance capture range, and an angle capture range.

25. The method of claim 24, wherein each corresponding edgelet is included in a correspondence list.

26. The method of claim 25, wherein the correspondence list is a list of lists.

27. The method of claim 24, wherein modifying the at least one parameter of the pose estimate is performed iteratively.

28. A method for tracking the motion of a pattern in an image undergoing a non-linear deformation over a sequence of images, the method comprising:
providing a current pose of a model aligned with a first image of the sequence, the current pose being a non-linear transformation having at least one parameter;
providing a second image of the sequence of images, the second image having a plurality of second image edgelets, each second image edgelet having a position and an orientation;
mapping the position and orientation of each model edgelet onto the second image using the current pose of the model in the first image to provide a plurality of mapped edgelets;
for each mapped edgelet, finding all second image features having a position within a distance capture range of the mapped edgelet, and having an orientation within an angular capture range of the mapped edgelet, so as to provide a correspondence list of run-time features of the mapped edgelet, thereby providing a plurality of correspondence lists;
for each mapped edgelet, finding a closest run-time edgelet within the correspondence list of the mapped edgelet;
for each mapped edgelet, finding a distance between the mapped edgelet and the closest second image edgelet within the correspondence list of the mapped edgelet; and
modifying the at least one parameter of the current pose so as to minimize an average over the plurality of mapped edgelets of the distance between each mapped edgelet and the closest second image edgelet within the correspondence list of the mapped edgelet, thereby providing an updated pose.

29. The method of claim 28, wherein the distance is the point-to-line distance between the mapped edgelet and the closest second image edgelet within the correspondence list of the mapped edgelet.

30. The method of claim 28, wherein modifying the at least one parameter proceeds as an iterative loop.

31. The method of claim 30, wherein the iterative loop is terminated when a number of iterations of the iterative loop reaches a maximum number of iterations.

32. The method of claim 30, wherein the iterative loop is terminated when the average over the plurality of mapped edgelets of the distance is less than an average distance threshold.

33. The method of claim 30, wherein the iterative loop is terminated when a change in the at least one parameter per iteration is less than a change threshold.

34. The method of claim 28, further comprising:
performing data-reduction on the model prior to mapping the position and orientation of each model edgelet.

35. The method of claim 34, wherein performing data-reduction includes chaining model edgelets, and discarding edgelets not included in a chain of edgelets.

36. The method of claim 34, wherein performing data-reduction includes discarding every $n^{th}$ edgelet, where n is an integer selected so as to reduce computation overhead while preserving sufficient accuracy for an application to which the method is applied.

37. The method of claim 28, wherein the plurality of model edgelets are obtained by first sub-sampling a model image to provide a sub-sampled model image, and then edge detecting the sub-sampled model image to provide a model having a plurality of edgelets.

38. The method of claim 28, wherein modifying the at least one parameter of the pose estimate includes:
computing a search direction in pose parameter space; and
incrementing the pose parameter in the search direction in pose parameter space.

39. the method of claim 38, wherein the search direction is in the direction of one of: gradient and robust gradient.

40. The method of claim 28, wherein the distance capture range of the mapped edgelet is sized so as to capture some run-time image edgelets in portions of a run-time image having an edge, and so as not to capture any run-time image edgelets in portions of the run-time image not having an edge.

41. The method of claim 28, wherein the average is an arithmetic average.

42. The method of claim 28, wherein the average is a root mean squared average.

43. The method of claim 28, wherein the pose estimate is a non-linear pose estimate.

44. The method of claim 43, wherein the non-linear pose estimate is a non-linear transformation selected from the group including:
perspective, cylinder, cone, polynomial, and thin-plate spline.

45. A method for refining a pose estimate of a model coarsely aligned with a run-time image, the model representing a two-dimensional pattern, the pose estimate including at least one pose estimate parameter, the model having a plurality of model features, the run-time image having a plurality of run-time features, the method comprising:
determining a given distance value representing a given distance between at (east a given one of the plurality of the model features mapped by a given pose estimate and a corresponding given run-time feature;
providing a two-dimensional model description of the two-dimensional model pattern; and
mapping the two-dimensional model pattern using the given pose estimate to create a transformed version of the two-dimensional model pattern, the transformed version representing a non-linear movement of at least portions of the two-dimensional model pattern in a direction orthogonal to a plane of the two-dimensional model description.

46. The method according to claim 45, wherein the model includes a geometric model.

47. The method according to claim 45, wherein the model features include model edgelets and wherein the run-time features include run-time edgelets.

48. The method according to claim 45, wherein plural distance values are determined respectively representing distances between individual ones of a plurality of the model features mapped using the given pose estimate and corresponding run-time features.

49. The method according to claim 45, further comprising modifying the at least one pose estimate parameter in order to reduce the given distance as represented by the given distance value.

50. The method according to claim 49, wherein the mapping includes a cylindrical mapping.

51. The method according to claim 49, wherein the mapping includes a perspective mapping.

52. A method comprising:
representing relative movement over time of a three dimensional target object with a sequence of image frames;
producing a model from a training image of an object, the model including model features of a portion of the target object, the model representing a two-dimensional model pattern;
tracking iteratively the target object from a given image frame of the image frames, while, for each iteration of the tracking, incrementing the given image frame to be a next image frame;
a given iteration of the tracking including, for a given run-time image within the given frame:
producing a current pose estimate configured to attempt to align the model features with the given run-time image;
mapping the model features using the current pose estimate;
refining the current pose estimate to produce a refined pose estimate, the refining including modifying at least one parameter of the current pose estimate to reduce a given distance between at least a given mapped model feature mapped using the current pose estimate and a corresponding run-time feature;
repeating both the mapping and the refining, while each time treating the most recently refined pose estimate as the current pose estimate; and
wherein the current pose estimate is used to map the model features to create a transformed version of the two-dimensional model pattern, the transformed version representing a perspective or deformed non-linear movement of at least portions of the two- dimensional model pattern in a direction orthogonal to a plane of the two-dimensional model pattern.

53. The method according to claim 52, wherein the sequence of image frames includes image frames taken by a camera.

54. The method according to claim 52, wherein the sequence of image frames includes image frames taken from different camera views.

55. The method according to claim 52, wherein the sequence of image frames includes image frames taken from a common camera view.

56. The method according to claim 52, further comprising obtaining a training image that is a flat feature of a three-dimensional training object and determining the two-dimensional model pattern from the training image.

57. The method according to claim 52, wherein the model features are obtained from a two-dimensional template requiring a non-linear transformation to map from the template to the given run-time image.

58. The method according to claim 52, further comprising producing the model features with a training process including imaging orthogonally to a 2D pattern.

59. The method according to claim 58, wherein the training process includes training with a real training image.

60. The method according to claim 58, wherein the training process includes training with a synthetic training image.

61. The method according to claim 52, further comprising extracting the model features from a two-dimensional training image.

62. The method according to claim 52, wherein one of the current pose estimates includes a coarsely aligned pose estimate.

63. The method according to claim 52, wherein a given run-time feature is deemed to be the corresponding run-time feature corresponding to the given mapped model feature when it is a member of a set of considered run-time features to be considered as possibly corresponding to the given mapped model feature.

64. The method according to claim 52, wherein the repeating of both the mapping and the refining includes repeating both the mapping and the refining up to a maximum number of iterations.

65. The method according to claim 52, wherein the repeating of both the mapping and the refining includes repeating both the mapping and the refining up to a number iterations determined as a function of the given distance.

66. The method according to claim 52, wherein the repeating of both the mapping and the refining includes repeating both the mapping and the refining up to a number of iterations coinciding with when the average, over a plural set of the mapped features, of the given distance is less than an average distance threshold.

67. The method according to claim 52, wherein the model features and the run-time features include edge-based features.

68. The method according to claim 52, wherein the model features and the run-time features include edgelets.

69. The method according to claim 52, wherein the model features and the run-time features include chains of edgelets.

70. The method according to claim 52, wherein the model features and the run-time features include features involving detection and sub-pixel location of edges.

71. A method comprising:
representing relative movement over time of a three-dimensional object with a sequence of image frames;
producing a model from a training image of an object, the model representing a two-dimensional model pattern;
for a given image frame, producing a coarsely aligned pose estimate of the model pattern coarsely aligned with a given run-time image within the given image frame by performing a non-linear transformation on the model;
for the same given image frame, refining the coarsely aligned pose estimate to produce a refined pose estimate by determining distance values representing distances between model features and corresponding run-time features; and
wherein the refined pose estimate is used to map the model features to create a transformed version of the two-dimensional model pattern, the transformed version representing a perspective or deformed non-linear movement of at least portions of the two-dimensional model pattern in a direction orthogonal to a plane of the two-dimensional model pattern.

72. The method according to claim 71, wherein the sequence of image frames are taken by a camera.

73. The method according to claim 72, wherein the sequence of image frames includes image frames taken from different camera views.

74. The method according to claim 73, wherein the sequence of image frames includes image frames taken from a common camera view.

75. The method according to claim 71, wherein the producing the model includes producing model features with a training process includes imaging orthogonally to a 2D pattern.

76. The method according to claim 71, wherein the model features of the two-dimensional pattern include model features extracted from a two-dimensional training image.

77. The method according to claim 71, comprising using a refined pose for a previous image frame as a coarsely aligned pose estimate for a next image frame.

78. Apparatus comprising:
computer-readable media;
a processor;
computer-readable media encoded representations of movement over time of a three-dimensional target object, the representations including a sequence of image frames;
computer-readable media encoded representations of a model from a training image of an object, the model including model features of a portion of the target object, the model representing a two-dimensional model pattern;
a tracker configured to track iteratively the target object for a given image frame of the image frames, while, for each iteration of the tracking, incrementing the given image frame to be a next image frame;
wherein the tracker is configured so that a given iteration of the tracking includes, for a given run-time image within the given frame:
producing a current pose estimate configured to attempt to align the model features with the given run-time image;
mapping the model features using the current pose estimate;
refining the current pose estimate to produce a refined posed estimate, the refining including modifying at least one parameter of the current pose estimate to reduce a given distance between a least a given mapped model feature mapped using the current pose estimate and a corresponding run-time feature;
repeating both the mapping and the refining, while each time treating the most recently refined pose estimate as the current pose estimate; and
wherein the current pose estimate is used to map the model features to create a transformed version of the two-dimensional model pattern, the transformed version representing a perspective or deformed non-linear movement of a least portions of the two-dimensional model pattern in a direction orthogonal to a plane of the two-dimensional model description.

79. The apparatus according to claim 78, wherein the model features and the run-time features include edge-based features.

80. The apparatus according to claim 78, wherein the model features and run-time features include edgelets.

81. The apparatus according to claim 78, wherein the model features and the run-time features include chains of edgelets.

82. The apparatus according to claim 78, wherein the model features and the run-time features include features involving detection and a sub-pixel location of edges.

83. Non-transitory computer-readable media including data, the data being encoded, when interoperably read by a computer, to cause:
   representing relative movement over time of a three-dimensional target object with a sequence of image frames;
   producing a model from a training image of an object, the model including model features of a portion of the target object, the model representing a two-dimensional model pattern;
   tracking iteratively the target object from a given image frame of the image frames, while, for each iteration of the tracking, incrementing the given image frame to be a next image frame;
   a given iteration of the tracking including, for a given run-time image within the given frame:
      producing a current pose estimate configured to attempt to align the model features with the given run-time image;
      mapping the model features using the current pose estimate;
      refining the current pose estimate to produce a refined pose estimate, the refining including modifying at least one parameter of the current pose estimate to reduce a given distance between at least a given mapped model feature mapped using the current pose estimate and a corresponding run-time feature;
      repeating both the mapping and the refining, while each time treating the most recently refined pose estimate as the current pose estimate; and
      wherein the current pose estimate is used to map the model features to create a transformed version of the two-dimensional model pattern, the transformed version representing a perspective or deformed non-linear movement of at least portions of the two-dimensional model pattern in a direction orthogonal to a plane of the two-dimensional model description.

84. The non-transitory computer-readable media according to claim 83, wherein the model features and the run-time features include edge-based features.

85. The non-transitory computer-readable media according to claim 83, wherein the model features and run-time features include edgelets.

86. The non-transitory computer-readable media according to claim 83, wherein the model features and the run-time features include chains of edgelets.

87. The non-transitory computer-readable media according to claim 83, wherein the model features and the run-time features include features involving a detection and a sub-pixel location of edges.

* * * * *